United States Patent
Odinaev et al.

(10) Patent No.: US 12,257,949 B2
(45) Date of Patent: Mar. 25, 2025

(54) ALERTING ON DRIVING AFFECTING SIGNAL

(71) Applicant: AUTOBRAINS TECHNOLOGIES LTD, Tel Aviv (IL)

(72) Inventors: Karina Odinaev, Tel Aviv (IL); Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 243 days.

(21) Appl. No.: 17/648,928

(22) Filed: Jan. 25, 2022

(65) Prior Publication Data

US 2022/0234501 A1 Jul. 28, 2022

Related U.S. Application Data

(60) Provisional application No. 63/199,790, filed on Jan. 25, 2021.

(51) Int. Cl.
*B60Q 9/00* (2006.01)
*G06F 3/16* (2006.01)
(Continued)

(52) U.S. Cl.
CPC .............. *B60Q 9/00* (2013.01); *G06F 3/165* (2013.01); *G10K 15/04* (2013.01); *H04R 1/08* (2013.01);
(Continued)

(58) Field of Classification Search
CPC .......... B60Q 9/00; G06F 3/165; G10K 15/04; H04R 1/08; H04R 3/00; H04R 2430/01;
(Continued)

(56) References Cited

U.S. PATENT DOCUMENTS

| | | |
|---|---|---|
| 4,601,395 A | 7/1986 | Juvinall et al. |
| 4,733,353 A | 3/1988 | Jaswa |

(Continued)

FOREIGN PATENT DOCUMENTS

| | | |
|---|---|---|
| AU | 2007201966 B2 | 2/2010 |
| CN | 101539530 A | 9/2009 |

(Continued)

OTHER PUBLICATIONS

Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.

(Continued)

*Primary Examiner* — Travis R Hunnings
(74) *Attorney, Agent, or Firm* — RECHES PATENTS

(57) ABSTRACT

A method for providing an in-vehicle indication, the method may include obtaining, during a driving session of a vehicle, external audio information about audio generated outside the vehicle; determining whether the audio generated outside the vehicle comprises driving affecting audio; and generating the in-vehicle indication, within the vehicle, when determining that the audio generated outside comprises driving affecting audio. The in-vehicle indication is indicative about the driving affecting audio generated outside the vehicle.

14 Claims, 22 Drawing Sheets

(51) Int. Cl.
*G10K 15/04* (2006.01)
*H04R 1/08* (2006.01)
*H04R 3/00* (2006.01)
*G08B 3/10* (2006.01)

(52) U.S. Cl.
CPC ............... *H04R 3/00* (2013.01); *G08B 3/10* (2013.01); *H04R 2430/01* (2013.01); *H04R 2499/13* (2013.01)

(58) Field of Classification Search
CPC ..... H04R 2499/13; G08B 3/10; B60W 50/14; B60W 40/02; B60W 40/06; B60W 40/08; B60W 2554/00; B60W 2554/4023; B60W 2554/4046; B60W 2556/45; B60W 2556/65; G08G 1/0962; G08G 1/0965
See application file for complete search history.

(56) References Cited

U.S. PATENT DOCUMENTS

| | | | |
|---|---|---|---|
| 4,932,645 A | 6/1990 | Schorey et al. | |
| 4,972,363 A | 11/1990 | Nguyen et al. | |
| 5,078,501 A | 1/1992 | Hekker et al. | |
| 5,214,746 A | 5/1993 | Fogel et al. | |
| 5,307,451 A | 4/1994 | Clark | |
| 5,369,773 A | 11/1994 | Hammerstrom | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador, III et al. | |
| 5,745,678 A | 4/1998 | Herzberg et al. | |
| 5,754,938 A | 5/1998 | Herz et al. | |
| 5,763,069 A | 6/1998 | Jordan | |
| 5,806,061 A | 9/1998 | Chaudhuri et al. | |
| 5,835,087 A | 11/1998 | Herz et al. | |
| 5,835,901 A | 11/1998 | Duvoisin et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,926,812 A | 7/1999 | Hilsenrath et al. | |
| 5,978,754 A | 11/1999 | Kumano | |
| 5,991,306 A | 11/1999 | Burns et al. | |
| 5,999,637 A | 12/1999 | Toyoda et al. | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,160,493 A * | 12/2000 | Smith ............... | G08G 1/0965 340/902 |
| 6,163,510 A | 12/2000 | Lee et al. | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,314,419 B1 | 11/2001 | Faisal | |
| 6,329,986 B1 | 12/2001 | Cheng | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,459,991 B1 | 10/2002 | Takiguchi et al. | |
| 6,507,672 B1 | 1/2003 | Watkins et al. | |
| 6,523,046 B2 | 2/2003 | Liu et al. | |
| 6,524,861 B1 | 2/2003 | Anderson | |
| 6,546,405 B2 | 4/2003 | Gupta et al. | |
| 6,550,018 B1 | 4/2003 | Abonamah et al. | |
| 6,557,042 B1 | 4/2003 | He et al. | |
| 6,594,699 B1 | 7/2003 | Sahai et al. | |
| 6,601,026 B2 | 7/2003 | Appelt et al. | |
| 6,611,628 B1 | 8/2003 | Sekiguchi et al. | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,681,032 B2 | 1/2004 | Bortolussi et al. | |
| 6,704,725 B1 | 3/2004 | Lee | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,985,172 B1 | 1/2006 | Rigney et al. | |
| 7,013,051 B2 | 3/2006 | Sekiguchi et al. | |
| 7,020,654 B1 | 3/2006 | Najmi | |
| 7,023,979 B1 | 4/2006 | Wu et al. | |
| 7,043,473 B1 | 5/2006 | Rassool et al. | |
| 7,158,681 B2 | 1/2007 | Persiantsev | |
| 7,215,828 B2 | 5/2007 | Luo | |
| 7,260,564 B1 | 8/2007 | Lynn et al. | |
| 7,289,643 B2 | 10/2007 | Brunk et al. | |
| 7,299,261 B1 | 11/2007 | Oliver et al. | |
| 7,302,089 B1 | 11/2007 | Smits | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,346,629 B2 | 3/2008 | Kapur et al. | |
| 7,353,224 B2 | 4/2008 | Chen et al. | |
| 7,376,672 B2 | 5/2008 | Weare | |
| 7,383,179 B2 | 6/2008 | Alves et al. | |
| 7,433,895 B2 | 10/2008 | Li et al. | |
| 7,464,086 B2 | 12/2008 | Black et al. | |
| 7,529,659 B2 | 5/2009 | Wold | |
| 7,577,656 B2 | 8/2009 | Kawai et al. | |
| 7,657,100 B2 | 2/2010 | Gokturk et al. | |
| 7,660,468 B2 | 2/2010 | Gokturk et al. | |
| 7,805,446 B2 | 9/2010 | Potok et al. | |
| 7,860,895 B1 | 12/2010 | Scofield et al. | |
| 7,872,669 B2 | 1/2011 | Darrell et al. | |
| 7,921,288 B1 | 4/2011 | Hildebrand | |
| 7,933,407 B2 | 4/2011 | Keidar et al. | |
| 8,023,739 B2 | 9/2011 | Hohimer et al. | |
| 8,026,944 B1 | 9/2011 | Sah | |
| 8,266,185 B2 | 9/2012 | Raichelgauz et al. | |
| 8,285,718 B1 | 10/2012 | Ong et al. | |
| 8,312,031 B2 | 11/2012 | Raichelgauz et al. | |
| 8,315,442 B2 | 11/2012 | Gokturk et al. | |
| 8,319,620 B2 * | 11/2012 | Usher ............... | G08G 1/0965 367/199 |
| 8,345,982 B2 | 1/2013 | Gokturk et al. | |
| 8,386,400 B2 | 2/2013 | Raichelgauz et al. | |
| 8,396,876 B2 | 3/2013 | Kennedy et al. | |
| 8,418,206 B2 | 4/2013 | Bryant et al. | |
| 8,442,321 B1 | 5/2013 | Chang et al. | |
| 8,457,827 B1 | 6/2013 | Ferguson et al. | |
| 8,495,489 B1 | 7/2013 | Everingham | |
| 8,635,531 B2 | 1/2014 | Graham et al. | |
| 8,655,801 B2 | 2/2014 | Raichelgauz et al. | |
| 8,655,878 B1 | 2/2014 | Kulkarni et al. | |
| RE44,963 E | 6/2014 | Shannon | |
| 8,799,195 B2 | 8/2014 | Raichelgauz et al. | |
| 8,799,196 B2 | 8/2014 | Raichelquaz et al. | |
| 8,818,916 B2 | 8/2014 | Raichelgauz et al. | |
| 8,868,861 B2 | 10/2014 | Shimizu et al. | |
| 8,886,648 B1 | 11/2014 | Procopio et al. | |
| 8,954,887 B1 | 2/2015 | Tseng et al. | |
| 8,990,199 B1 | 3/2015 | Ramesh et al. | |
| 9,009,086 B2 | 4/2015 | Raichelgauz et al. | |
| 9,104,747 B2 | 8/2015 | Raichelgauz et al. | |
| 9,165,406 B1 | 10/2015 | Gray et al. | |
| 9,235,557 B2 | 1/2016 | Raichelgauz et al. | |

(56) References Cited

U.S. PATENT DOCUMENTS

| | | |
|---|---|---|
| 9,286,623 B2 | 3/2016 | Raichelgauz et al. |
| 9,311,308 B2 | 4/2016 | Sankarasubramaniam et al. |
| 9,323,754 B2 | 4/2016 | Ramanathan et al. |
| 9,392,324 B1 | 7/2016 | Maltar et al. |
| 9,416,499 B2 | 8/2016 | Cronin et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,863,928 B1 | 1/2018 | Peterson et al. |
| 9,875,445 B2 | 1/2018 | Amer et al. |
| 9,953,533 B1 | 4/2018 | Graves |
| 9,953,535 B1 | 4/2018 | Canavor et al. |
| 9,984,369 B2 | 5/2018 | Li et al. |
| 10,048,700 B1 | 8/2018 | Curlander et al. |
| 10,157,291 B1 | 12/2018 | Kenthapadi et al. |
| 10,235,882 B1 | 3/2019 | Aoude et al. |
| 10,253,468 B1 | 4/2019 | Linville et al. |
| 10,395,332 B1 | 8/2019 | Konrardy et al. |
| 10,414,398 B2 | 9/2019 | Ochi |
| 10,416,670 B1 | 9/2019 | Fields et al. |
| 10,417,914 B1 | 9/2019 | Vose et al. |
| 10,467,893 B1 | 11/2019 | Soryal et al. |
| 10,545,023 B1 | 1/2020 | Herbach et al. |
| 10,684,626 B1 | 6/2020 | Martin |
| 10,916,124 B2 | 2/2021 | Geisler |
| 10,922,788 B1 | 2/2021 | Yu et al. |
| 10,967,877 B2 | 4/2021 | Asakura et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0181336 A1 | 12/2002 | Shields |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0145002 A1 | 7/2003 | Kleinberger et al. |
| 2003/0158839 A1 | 8/2003 | Faybishenko et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0257233 A1 | 12/2004 | Proebsting |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0149369 A1 | 7/2005 | Sevdermish |
| 2005/0163375 A1 | 7/2005 | Grady |
| 2005/0172130 A1 | 8/2005 | Roberts |
| 2005/0177372 A1 | 8/2005 | Wang et al. |
| 2005/0193093 A1 | 9/2005 | Mathew et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0074588 A1 | 4/2006 | Blodgett et al. |
| 2006/0080311 A1 | 4/2006 | Potok et al. |
| 2006/0093190 A1 | 5/2006 | Cheng et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0267975 A1 | 11/2006 | Moses et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0081088 A1 | 4/2007 | Gotoh et al. |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0282513 A1 | 12/2007 | Michi et al. |
| 2007/0294187 A1 | 12/2007 | Scherrer |
| 2007/0298152 A1 | 12/2007 | Baets |
| 2008/0006615 A1 | 1/2008 | Rosario et al. |
| 2008/0049789 A1 | 2/2008 | Vedantham et al. |
| 2008/0071465 A1 | 3/2008 | Chapman et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0161986 A1 | 7/2008 | Breed |
| 2008/0165018 A1 | 7/2008 | Breed |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228749 A1 | 9/2008 | Brown |

(56) References Cited

U.S. PATENT DOCUMENTS

| | | |
|---|---|---|
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0232361 A1 | 9/2009 | Miller |
| 2009/0234878 A1 | 9/2009 | Herz et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0010751 A1 | 1/2010 | Blodgett et al. |
| 2010/0010752 A1 | 1/2010 | Blodgett et al. |
| 2010/0030474 A1 | 2/2010 | Sawada |
| 2010/0035648 A1 | 2/2010 | Huang |
| 2010/0042646 A1 | 2/2010 | Raichelgauz et al. |
| 2010/0049374 A1 | 2/2010 | Ferrin et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0161652 A1 | 6/2010 | Bellare et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0262609 A1 | 10/2010 | Raichelgauz et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0060496 A1 | 3/2011 | Nielsen et al. |
| 2011/0077028 A1 | 3/2011 | Wilkes, III et al. |
| 2011/0164180 A1 | 7/2011 | Lee |
| 2011/0164810 A1 | 7/2011 | Zang et al. |
| 2011/0190972 A1 | 8/2011 | Timmons et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2011/0307542 A1 | 12/2011 | Wang et al. |
| 2012/0041969 A1 | 2/2012 | Priyadarshan et al. |
| 2012/0131454 A1 | 5/2012 | Shah |
| 2012/0136853 A1 | 5/2012 | Kennedy et al. |
| 2012/0155726 A1 | 6/2012 | Li et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0219191 A1 | 8/2012 | Benzarti et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0211705 A1 | 8/2013 | Geelen et al. |
| 2013/0222127 A1* | 8/2013 | Ray Avalani ............ B60Q 1/00 340/436 |
| 2013/0226930 A1 | 8/2013 | Arngren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1 | 2/2014 | Sato et al. |
| 2014/0125703 A1 | 5/2014 | Roveta et al. |
| 2014/0139670 A1 | 5/2014 | Kesavan et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0195093 A1 | 7/2014 | Litkouhi et al. |
| 2014/0198986 A1 | 7/2014 | Marchesotti |
| 2014/0201126 A1 | 7/2014 | Zadeh et al. |
| 2014/0201330 A1 | 7/2014 | Lopez et al. |
| 2014/0236414 A1 | 8/2014 | Droz et al. |
| 2014/0247342 A1 | 9/2014 | Ellenby et al. |
| 2014/0250032 A1 | 9/2014 | Huang et al. |
| 2014/0282655 A1 | 9/2014 | Roberts |
| 2014/0288453 A1 | 9/2014 | Liu et al. |
| 2014/0300722 A1 | 10/2014 | Garcia |
| 2014/0328512 A1 | 11/2014 | Gurwicz et al. |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1 | 2/2015 | Kozloski et al. |
| 2015/0057869 A1 | 2/2015 | Healey et al. |
| 2015/0071457 A1 | 3/2015 | Burciu |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0120760 A1 | 4/2015 | Wang et al. |
| 2015/0123968 A1 | 5/2015 | Holverda et al. |
| 2015/0127516 A1 | 5/2015 | Studnitzer et al. |
| 2015/0130643 A1 | 5/2015 | Nagy |
| 2015/0153735 A1 | 6/2015 | Clarke et al. |
| 2015/0166069 A1 | 6/2015 | Engelman et al. |
| 2015/0190284 A1 | 7/2015 | Censo et al. |
| 2015/0203116 A1 | 7/2015 | Fairgrieve et al. |
| 2015/0213325 A1 | 7/2015 | Krishnamoorthi et al. |
| 2015/0224988 A1 | 8/2015 | Buerkle et al. |
| 2015/0248586 A1 | 9/2015 | Gaidon et al. |
| 2015/0254344 A1 | 9/2015 | Kulkarni et al. |
| 2015/0266455 A1 | 9/2015 | Wilson |
| 2015/0286742 A1 | 10/2015 | Zhang et al. |
| 2015/0286872 A1 | 10/2015 | Medioni et al. |
| 2015/0293976 A1 | 10/2015 | Guo et al. |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0046298 A1 | 2/2016 | Deruyck et al. |
| 2016/0078339 A1 | 3/2016 | Li et al. |
| 2016/0127641 A1 | 5/2016 | Gove |
| 2016/0132194 A1 | 5/2016 | Grue et al. |
| 2016/0133130 A1 | 5/2016 | Grimm et al. |
| 2016/0142625 A1 | 5/2016 | Weksler et al. |
| 2016/0193996 A1 | 7/2016 | Stefan |
| 2016/0221592 A1 | 8/2016 | Puttagunta et al. |
| 2016/0275766 A1 | 9/2016 | Venetianer et al. |
| 2016/0284095 A1 | 9/2016 | Chalom et al. |

(56) References Cited

U.S. PATENT DOCUMENTS

| | | |
|---|---|---|
| 2016/0302046 A1 | 10/2016 | Velusamy |
| 2016/0306798 A1 | 10/2016 | Guo et al. |
| 2016/0330394 A1 | 11/2016 | Shahraray et al. |
| 2016/0355181 A1 | 12/2016 | Teraoka et al. |
| 2016/0379091 A1 | 12/2016 | Lin et al. |
| 2017/0007521 A1 | 1/2017 | Monsonis et al. |
| 2017/0008521 A1 | 1/2017 | Braunstein et al. |
| 2017/0017638 A1 | 1/2017 | Satyavarta et al. |
| 2017/0018178 A1 | 1/2017 | Poechmueller et al. |
| 2017/0072851 A1 | 3/2017 | Shenoy et al. |
| 2017/0075036 A1 | 3/2017 | Pikhletsky et al. |
| 2017/0078621 A1 | 3/2017 | Sahay et al. |
| 2017/0090473 A1 | 3/2017 | Cooper et al. |
| 2017/0092122 A1 | 3/2017 | Sharan |
| 2017/0111576 A1 | 4/2017 | Tojo et al. |
| 2017/0136842 A1 | 5/2017 | Anderson et al. |
| 2017/0154241 A1 | 6/2017 | Shambik et al. |
| 2017/0180623 A1 | 6/2017 | Lin |
| 2017/0243370 A1 | 8/2017 | Hoye et al. |
| 2017/0263128 A1 | 9/2017 | Chandran et al. |
| 2017/0293296 A1 | 10/2017 | Stenneth et al. |
| 2017/0297401 A1 | 10/2017 | Hrovat et al. |
| 2017/0344023 A1 | 11/2017 | Laubinger et al. |
| 2017/0351268 A1 | 12/2017 | Anderson et al. |
| 2018/0022361 A1 | 1/2018 | Rao et al. |
| 2018/0025235 A1 | 1/2018 | Fridman |
| 2018/0046869 A1 | 2/2018 | Cordell et al. |
| 2018/0060690 A1 | 3/2018 | Lee et al. |
| 2018/0061253 A1 | 3/2018 | Hyun |
| 2018/0082591 A1 | 3/2018 | Pandy |
| 2018/0101177 A1 | 4/2018 | Cohen |
| 2018/0108258 A1 | 4/2018 | Dilger |
| 2018/0113461 A1 | 4/2018 | Potnis et al. |
| 2018/0144640 A1 | 5/2018 | Price et al. |
| 2018/0151073 A1 | 5/2018 | Minemura et al. |
| 2018/0157666 A1 | 6/2018 | Raichelgauz et al. |
| 2018/0157903 A1 | 6/2018 | Tu et al. |
| 2018/0170392 A1 | 6/2018 | Yang et al. |
| 2018/0174001 A1 | 6/2018 | Kang |
| 2018/0188731 A1 | 7/2018 | Matthiesen et al. |
| 2018/0188746 A1 | 7/2018 | Lesher et al. |
| 2018/0189613 A1 | 7/2018 | Wolf et al. |
| 2018/0204335 A1 | 7/2018 | Agata et al. |
| 2018/0208211 A1* | 7/2018 | Chiba ............... G08G 1/166 |
| 2018/0210462 A1 | 7/2018 | Switkes et al. |
| 2018/0218608 A1 | 8/2018 | Offenhaeuser et al. |
| 2018/0268292 A1 | 9/2018 | Choi et al. |
| 2018/0338229 A1 | 11/2018 | Nemec et al. |
| 2018/0354505 A1 | 12/2018 | Meier et al. |
| 2018/0356817 A1 | 12/2018 | Poeppel |
| 2018/0373929 A1 | 12/2018 | Ye |
| 2019/0027032 A1* | 1/2019 | Arunachalam ...... G08G 1/0965 |
| 2019/0034764 A1 | 1/2019 | Oh et al. |
| 2019/0064929 A1 | 2/2019 | Tomeh et al. |
| 2019/0071093 A1 | 3/2019 | Ma et al. |
| 2019/0072965 A1 | 3/2019 | Zhang et al. |
| 2019/0072966 A1 | 3/2019 | Zhang et al. |
| 2019/0073908 A1 | 3/2019 | Neubecker et al. |
| 2019/0088135 A1 | 3/2019 | Do et al. |
| 2019/0096135 A1 | 3/2019 | Mutto et al. |
| 2019/0114489 A1* | 4/2019 | Jackson ............... G06V 10/82 |
| 2019/0139419 A1 | 5/2019 | Wendt et al. |
| 2019/0147259 A1 | 5/2019 | Molin et al. |
| 2019/0163204 A1 | 5/2019 | Bai et al. |
| 2019/0171912 A1 | 6/2019 | Vallespi-Gonzalez et al. |
| 2019/0193751 A1 | 6/2019 | Fernando et al. |
| 2019/0196471 A1 | 6/2019 | Vaughn et al. |
| 2019/0205798 A1 | 7/2019 | Rosas-Maxemin et al. |
| 2019/0213324 A1 | 7/2019 | Thorn |
| 2019/0220011 A1 | 7/2019 | Penna |
| 2019/0225214 A1 | 7/2019 | Pohl et al. |
| 2019/0246042 A1 | 8/2019 | Liu |
| 2019/0253614 A1 | 8/2019 | Oleson et al. |
| 2019/0279046 A1 | 9/2019 | Han et al. |
| 2019/0279293 A1 | 9/2019 | Tang et al. |
| 2019/0287515 A1 | 9/2019 | Li et al. |
| 2019/0291720 A1 | 9/2019 | Xiao et al. |
| 2019/0304102 A1 | 10/2019 | Chen et al. |
| 2019/0311226 A1 | 10/2019 | Xiao et al. |
| 2019/0315346 A1 | 10/2019 | Yoo et al. |
| 2019/0337521 A1 | 11/2019 | Stauber |
| 2019/0340924 A1 | 11/2019 | Abari et al. |
| 2019/0347492 A1 | 11/2019 | Morimura et al. |
| 2019/0355132 A1 | 11/2019 | Kushleyev et al. |
| 2019/0378006 A1 | 12/2019 | Fukuda et al. |
| 2019/0384303 A1 | 12/2019 | Muller et al. |
| 2019/0392831 A1 | 12/2019 | Pohl |
| 2020/0012871 A1 | 1/2020 | Lee et al. |
| 2020/0027002 A1 | 1/2020 | Hickson et al. |
| 2020/0027351 A1 | 1/2020 | Gotoda et al. |
| 2020/0027355 A1 | 1/2020 | Sujan et al. |
| 2020/0053262 A1 | 2/2020 | Wexler et al. |
| 2020/0074326 A1 | 3/2020 | Balakrishnan et al. |
| 2020/0086881 A1 | 3/2020 | Abendroth et al. |
| 2020/0090426 A1 | 3/2020 | Barnes et al. |
| 2020/0110982 A1 | 4/2020 | Gou et al. |
| 2020/0117902 A1 | 4/2020 | Wexler et al. |
| 2020/0120267 A1 | 4/2020 | Netto et al. |
| 2020/0125927 A1 | 4/2020 | Kim |
| 2020/0126276 A1* | 4/2020 | Rakshit ............... G06T 11/60 |
| 2020/0156784 A1 | 5/2020 | Carnell |
| 2020/0175384 A1 | 6/2020 | Zhang et al. |
| 2020/0175550 A1 | 6/2020 | Raichelgauz et al. |
| 2020/0269864 A1 | 8/2020 | Zhang et al. |
| 2020/0272940 A1 | 8/2020 | Sun et al. |
| 2020/0293035 A1 | 9/2020 | Sakurada et al. |
| 2020/0301653 A1* | 9/2020 | Lee ..................... G06F 3/165 |
| 2020/0302295 A1 | 9/2020 | Tung et al. |
| 2020/0304707 A1 | 9/2020 | Williams et al. |
| 2020/0324778 A1 | 10/2020 | Diamond et al. |
| 2020/0370890 A1 | 11/2020 | Hamilton et al. |
| 2020/0371518 A1 | 11/2020 | Kang |
| 2020/0410322 A1 | 12/2020 | Naphade et al. |
| 2021/0009270 A1 | 1/2021 | Chen et al. |
| 2021/0041248 A1 | 2/2021 | Li et al. |
| 2021/0049908 A1 | 2/2021 | Pipe et al. |
| 2021/0055741 A1 | 2/2021 | Kawanai et al. |
| 2021/0056492 A1 | 2/2021 | Zass |
| 2021/0056852 A1 | 2/2021 | Lund et al. |
| 2021/0096565 A1 | 4/2021 | Xie et al. |
| 2021/0097309 A1 | 4/2021 | Kaku et al. |
| 2021/0134317 A1* | 5/2021 | Dingli ................. H04R 3/04 |
| 2021/0148831 A1 | 5/2021 | Raichelgauz et al. |
| 2021/0164177 A1 | 6/2021 | Wientjes |
| 2021/0182539 A1 | 6/2021 | Rassool |
| 2021/0192357 A1 | 6/2021 | Sinha et al. |
| 2021/0209332 A1 | 7/2021 | Nishio et al. |
| 2021/0224917 A1 | 7/2021 | Gaudin et al. |
| 2021/0248904 A1 | 8/2021 | Nguyen |
| 2021/0266437 A1 | 8/2021 | Wexler et al. |
| 2021/0269045 A1* | 9/2021 | Katz ................. G02B 27/0093 |
| 2021/0272207 A1 | 9/2021 | Fields et al. |
| 2021/0284183 A1 | 9/2021 | Marenco et al. |
| 2021/0284191 A1 | 9/2021 | Raichelgauz et al. |
| 2021/0316747 A1 | 10/2021 | Klein |
| 2021/0390351 A1 | 12/2021 | Romain, II |
| 2021/0390840 A1 | 12/2021 | Rejal et al. |
| 2021/0409593 A1 | 12/2021 | Zacharias et al. |
| 2022/0005291 A1 | 1/2022 | Konrardy et al. |
| 2022/0038620 A1 | 2/2022 | Demers |
| 2022/0058393 A1 | 2/2022 | Calvert et al. |
| 2022/0116709 A1* | 4/2022 | Hook .................. B60R 11/0217 |
| 2022/0126864 A1 | 4/2022 | Moustafa et al. |
| 2022/0161815 A1 | 5/2022 | Beek et al. |
| 2022/0187847 A1 | 6/2022 | Cella et al. |
| 2022/0191389 A1 | 6/2022 | Lei |
| 2022/0234501 A1 | 7/2022 | Odinaev et al. |
| 2022/0286603 A1 | 9/2022 | Lv et al. |

(56) References Cited

U.S. PATENT DOCUMENTS

2022/0327886 A1 10/2022 Mathur et al.
2022/0345621 A1 10/2022 Shi et al.

FOREIGN PATENT DOCUMENTS

| | | |
|---|---|---|
| CN | 107472252 B | 4/2022 |
| CN | 111866468 B | 6/2022 |
| DE | 102012009297 A1 | 12/2012 |
| DE | 102016122686 A1 | 5/2018 |
| EP | 1085464 A3 | 1/2007 |
| EP | 3910540 A1 | 11/2021 |
| JP | 2018511807 A | 4/2018 |
| WO | 0231764 A2 | 4/2002 |
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2014141282 A1 | 9/2014 |
| WO | 2016040376 A1 | 3/2016 |
| WO | 2016070193 A1 | 5/2016 |
| WO | 2018035145 A1 | 2/2018 |
| WO | 2018132088 A1 | 7/2018 |

OTHER PUBLICATIONS

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

"Computer Vision Demonstration Website", Electronics and Computer Science, University of Southampton, 2005, USA.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Galvane, Quentin, et al. "Automated cinematography with unmanned aerial vehicles." arXiv preprint arXiv:1712.04353 (2017). (Year: 2017).

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).

Huang, Chong, et al. "One-shot imitation filming of human motion videos." arXiv preprint arXiv:1912.10609 (2019). (Year: 2019).

J. Chen and P. Carr, "Mimicking Human Camera Operators," 2015 IEEE Winter Conference on Applications of Computer Vision, 2015, pp. 215-222, doi: 10.1109/WACV.2015.36. (Year: 2015).

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Joubert, Niels, et al. "Towards a drone cinematographer: Guiding quadrotor cameras using visual composition principles." arXivpreprint arXiv: 1610.01691 (2016). (Year: 2916).

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).

Lin et al., "Generating robust digital signature for image/video authentication", Multimedia and Security Workshop at ACM Multimedia '98, Bristol, U.K., Sep. 1998, pp. 245-251.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

M. Gschwindt,, "Can a Robot Become a Movie Director? Learning Artistic Principles for Aerial Cinematography," 2019 IEEE/RSJw International Conference on Intelligent Robots and Systems (IROS), 2019, pp. 1107-1114, doi: 10.1109/IROS40897.2019.896759 (Year: 2019).

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

(56) References Cited

OTHER PUBLICATIONS

Queluz, "Content-Based Integrity Protection of Digital Images", SPIE Conf. on Security and Watermarking of Multimedia Contents, San Jose, Jan. 1999, pp. 85-93.
Retrieval, Story. Ehsan Younessian. Diss. Nanyang Technological University, 2013: i-187 (Year: 2013).
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Stolberg et al ("Hibrid-Soc: A Multi-Core Soc Architecture for Multimedia Signal Processing" 2003).
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop On Parallel and Distributed Processing, 1996. PDP '96, pp. 274-281.
Vallet et al ("Personalized Content Retrieval in Context Using Ontological Knowledge" Mar. 2007) (Year: 2007).
Vallet, David, et al. "Personalized content retrieval in context using ontological knowledge." IEEE Transactions on circuits andsystems for video technology 17.3 (2007): 336-346. (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27- 29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Yanai, Generic Image Classification Using Visual Knowledge on the Web, pp. 167-174 (Year: 2003).

\* cited by examiner

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

ALERTING ON DRIVING AFFECTING SIGNAL

BACKGROUND

Playing loud music in a car, especially while driving may distract the driver and may increase the chances of a car accident. It is even illegal in various countries.

There is a need to reduce the risk associated with playing loud music in a car.

BRIEF DESCRIPTION OF THE DRAWINGS

The embodiments of the disclosure will be understood and appreciated more fully from the following detailed description, taken in conjunction with the drawings in which:

FIG. 1D illustrates an example of a merge operation.

DESCRIPTION OF EXAMPLE EMBODIMENTS

Figure 1A:
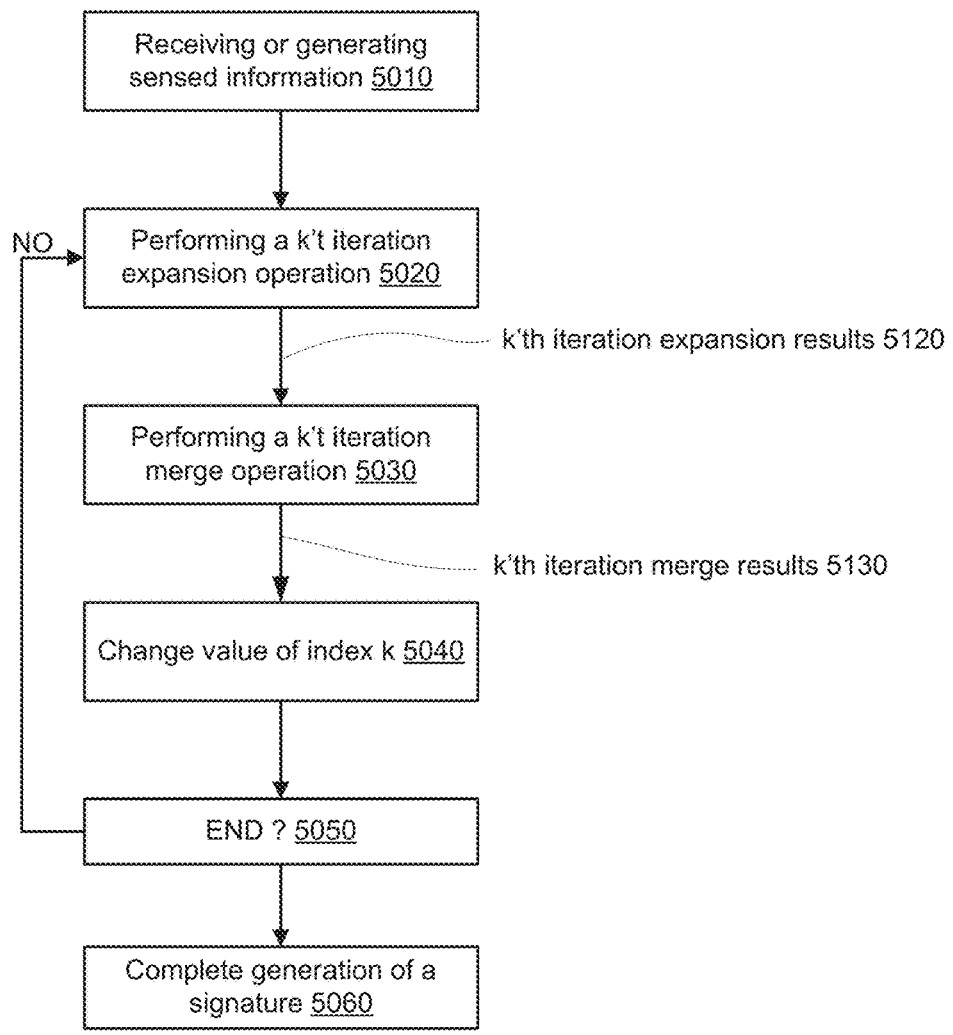
FIG. 1A illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or computerized system capable of executing the method and/or to a non-transitory computer readable medium that stores instructions for executing the method.

Any reference in the specification to a computerized system or device should be applied mutatis mutandis to a method that may be executed by the computerized system, and/or may be applied mutatis mutandis to non-transitory computer readable medium that stores instructions executable by the computerized system.

Any reference in the specification to a non-transitory computer readable medium should be applied mutatis mutandis to a device or computerized system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of computerized systems, units, components, processors, sensors, illustrated in the specification and/or drawings may be provided.

Any reference to any of the term "comprising" may be applied mutatis mutandis to the terms "consisting" and "consisting essentially of".

Any reference to any of the term "consisting" may be applied mutatis mutandis to the terms "comprising" and "consisting essentially of".

Any reference to any of the term "consisting essentially of" may be applied mutatis mutandis to the terms "comprising" and "comprising".

Audio generated outside the vehicle may include driving affecting audio. Driving affecting audio is audio that may affect a manner in which a vehicle is driven. Driving affecting audio may be for example, any audio generated by an entity (being human or non-human) that may affect the driving of the vehicle. Affect may include should be taken into account when driving. Non-limiting example are audio alerts, audio that was found (for example learnt) as preceding accidents or near accidents, sounds of brakes, horns, shouts, a sound of an approaching train, and the like. The driving affecting audio may be aimed to a driver (for example—shouts, alerts, horns) or not directly aimed to the driver (braking sounds), and the like. What amounts to a driving affecting audio may be learnt in any manner, may be provided to the system executing any of the following methods in any manner, may change over time, may be determined based on feedback, and the like.

Figure 2A:
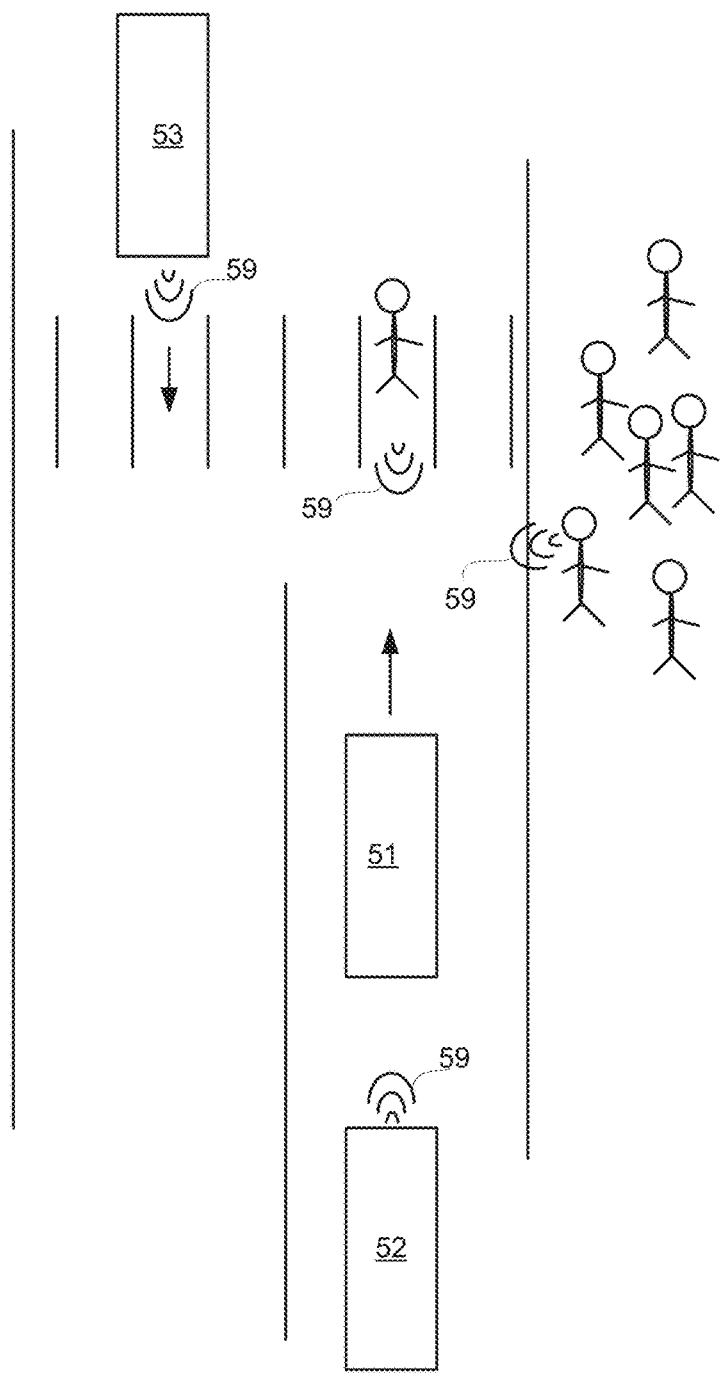
FIG. 2A is an example of a situation.
Figure 2B:
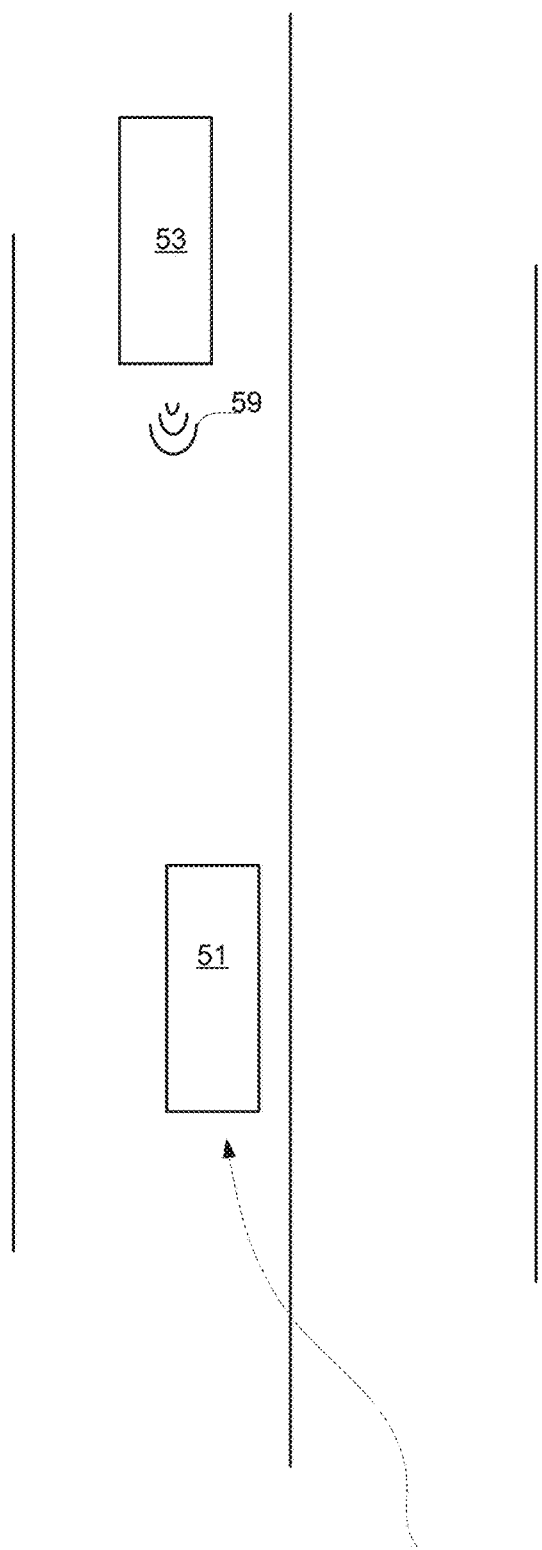
FIG. 2B is an example of a situation.

FIGS. 2A and 2B illustrate examples in which vehicle 51 is in situations that may cause other entities outside the vehicle to generate audio that may include driving affecting audio (denoted 59).

In FIG. 2A, vehicle 51 reaches a zebra cross located at excessive speed—which may trigger a generation of driving affecting audio 59 by a person that crosses the zebra crossing, one or more other pedestrian, a vehicle 52 following vehicle 51 and/or another vehicle 53 that drives at an opposite lane of vehicle 51.

In FIG. 2B, vehicle 51 deviates to an opposite lane and this may a generation of driving affecting audio 59 by another vehicle 53 that drives at an opposite lane of vehicle 51.

Figure 3A:
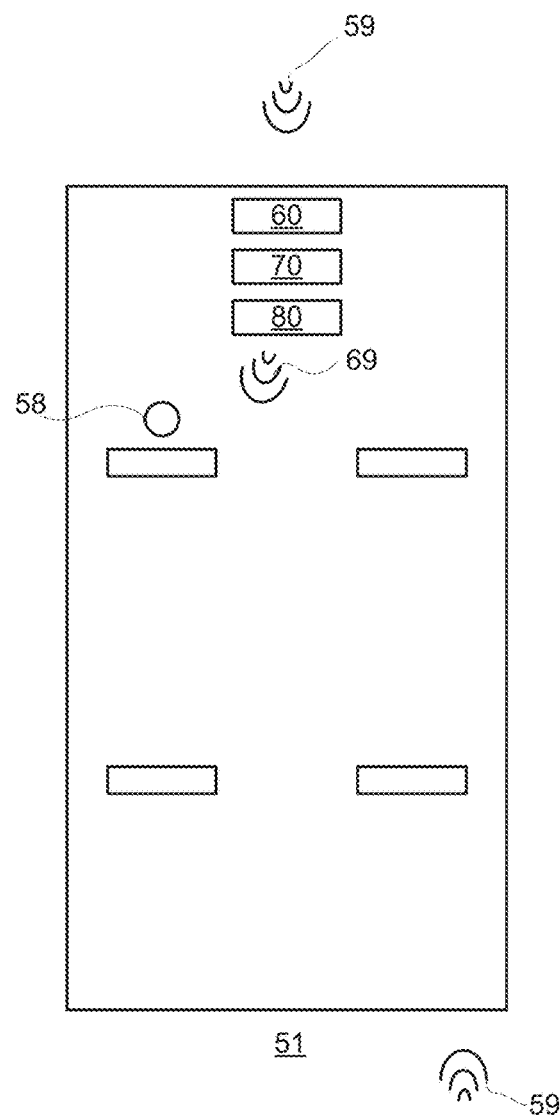
FIG. 3A is an example of a vehicle.
Figure 3B:
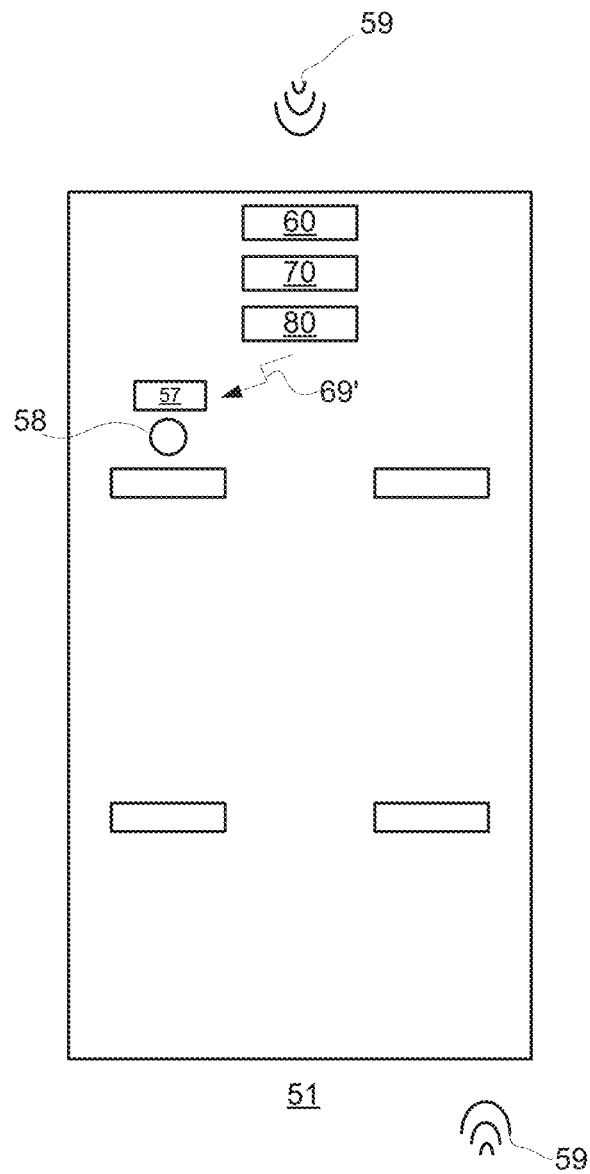
FIG. 3B is an example of a vehicle.
Figure 3C:
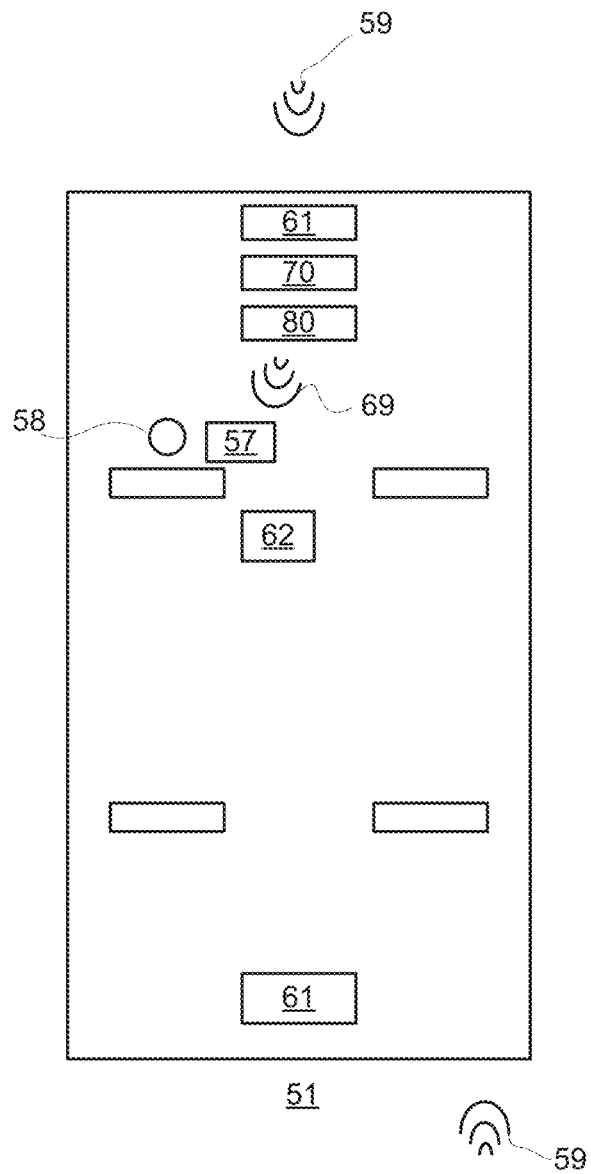
FIG. 3C is an example of a vehicle.

FIGS. 3A, 3B and 3C illustrates examples of vehicle 51 and driving affecting audio 59 generated outside the vehicle. Driver 58 is located within the vehicle.

The vehicle includes sensing unit 60 that may include one or more audio sensors (in FIG. 3C the sensing unit includes audio sensors 61 for sensing audio generated outside the vehicle and a in-vehicle sensor 62 for sensing the audio near driver 58). Any of the sensing unit 61 may include any other type of sensors.

The vehicle also includes a decision unit 70 that may include a processor and/or any other components, that may be configured to determine whether the audio generated outside the vehicle includes driving affecting audio.

The vehicle may include generator 80 for generating at least one of the in vehicle indicator (denoted 69 in FIGS. 3A and 3C) or for generating a request, a trigger or a command (denoted 69' in FIG. 3B) to another device (such a driver wearable device 57) to generate the in-vehicle indication.

Figure 4A:
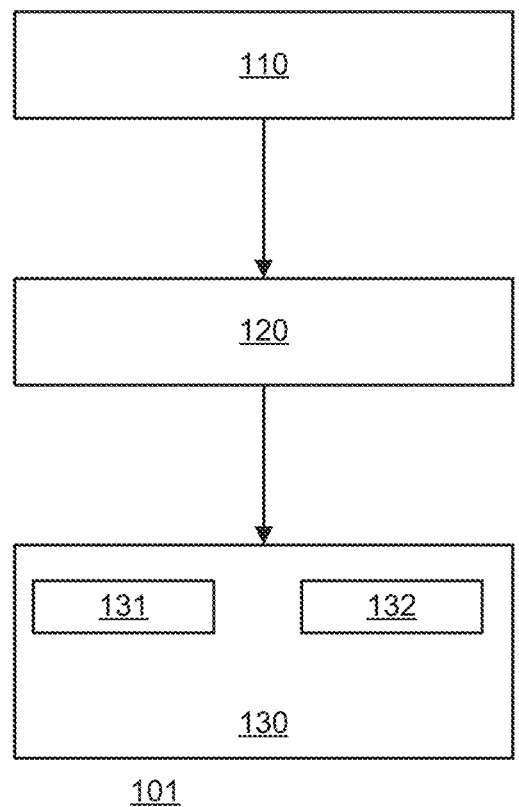
FIG. 4A is an example of a method.

FIG. 4A illustrates method 101 for providing an in-vehicle indication.

Method 100 start by step 110 of obtaining, during a driving session of a vehicle, external audio information about audio generated outside the vehicle.

Step 110 may include sensing the audio generated outside the vehicle and generating the external audio information and/or receiving sensed information indicative of the audio generated outside the vehicle, and the like. Step 110 may be executed by one or more audio sensors located in any location—for example—external audio sensors facing the exterior of the vehicle, or acoustically coupled to the exterior of the vehicle.

Step 110 may be followed by step 120 of determining whether the audio generated outside the vehicle includes driving affecting audio. The determination can be made in any manner, for example searching for signatures of driving affecting audio, searching in any manner that presence of driving affecting audio, applying a machine learning process trained to locate the driving affecting audio, and the like. An example for detecting certain media unit content is illustrated in PCT patent application PCT/IB2019/058207 which is incorporated herein by reference.

Step 120 may be followed by step 130 of generating the in-vehicle indication, within the vehicle, when determining that the audio generated outside comprises driving affecting audio. The in-vehicle indication is indicative about the driving affecting audio generated outside the vehicle.

The in-vehicle indication may be provided in any form—audio, visual, audio-visual, tactile, or any other signal. Tactile alerts may be provided by contacting the driver in a controlled manner.

The driving relevant in-vehicle audio may be reconstructed version of the driving affecting audio. Reconstructed—may include audio components of the driving affecting audio, or may be processed in any other manner—for example by applying filtering, noise reduction, and the like.

Step 130 may take into account various parameters—such as other signals that may be presented to the driver (for example—other sounds that are heard by the driver, the manner in which the driver is receiving other signals—using earphones, using a vehicle media device, the loudness other audio signals heard by the driver, and the like).

Step 130 may include step 131 of estimating at least one other sound (for example—music, podcast, radio station) to be generated within the vehicle, when the driving relevant in-vehicle audio is played in the vehicle, wherein the at least one other sound differs from the driving relevant in-vehicle audio.

Step 130 may include step 132 of generating the driving relevant in-vehicle audio to be heard by at least the driver at the presence of the at least one other sound. Thus—the in-vehicle audio should overcome the at least one other sound.

Figure 4B:
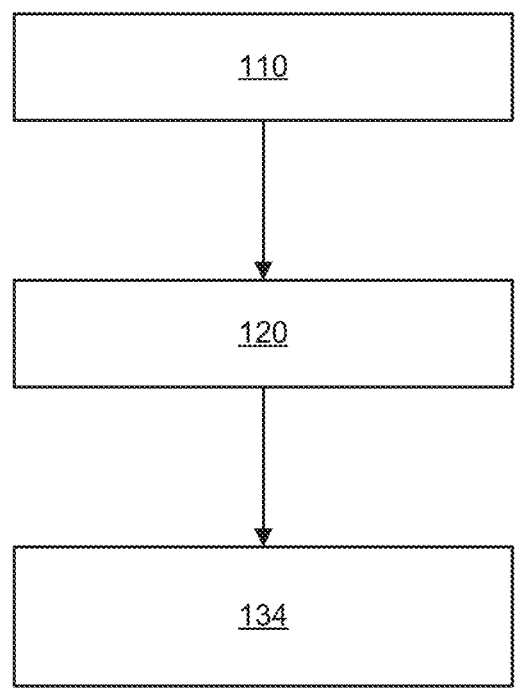
FIG. 4B is an example of a method.

FIG. 4B illustrates method 102 for providing an in-vehicle indication.

Method 101 start by step 110 of obtaining, during a driving session of a vehicle, external audio information about audio generated outside the vehicle.

Step 110 may be followed by step 120 of determining whether the audio generated outside the vehicle includes driving affecting audio.

Step 120 may be followed by step 134 of providing a request, a trigger or a command to another device to generate the in-vehicle indication.

The request, trigger a command can be sent to another device that in turn may generate the in-vehicle indication.

The other device may be a part of the vehicle, a multimedia device, a speaker of the vehicle, the other device may be positioned (at least temporarily) within the vehicle, may belong to or used by the driver (for example earphones, mobile phone, mobile computer, smart phone), and the like.

Step 134 may also include requesting, commanding or triggering the other device to change at least one other signal outputted by the other device when the in-vehicle indication is generated or in timing proximity (for example a few seconds) to the transmission of the in-vehicle indication.

For example—the other device may be requested, triggered to or instructed to generate only the in-vehicle indication, to attenuate other output signals when the in-vehicle indication is outputted, and the like.

Figure 4C:
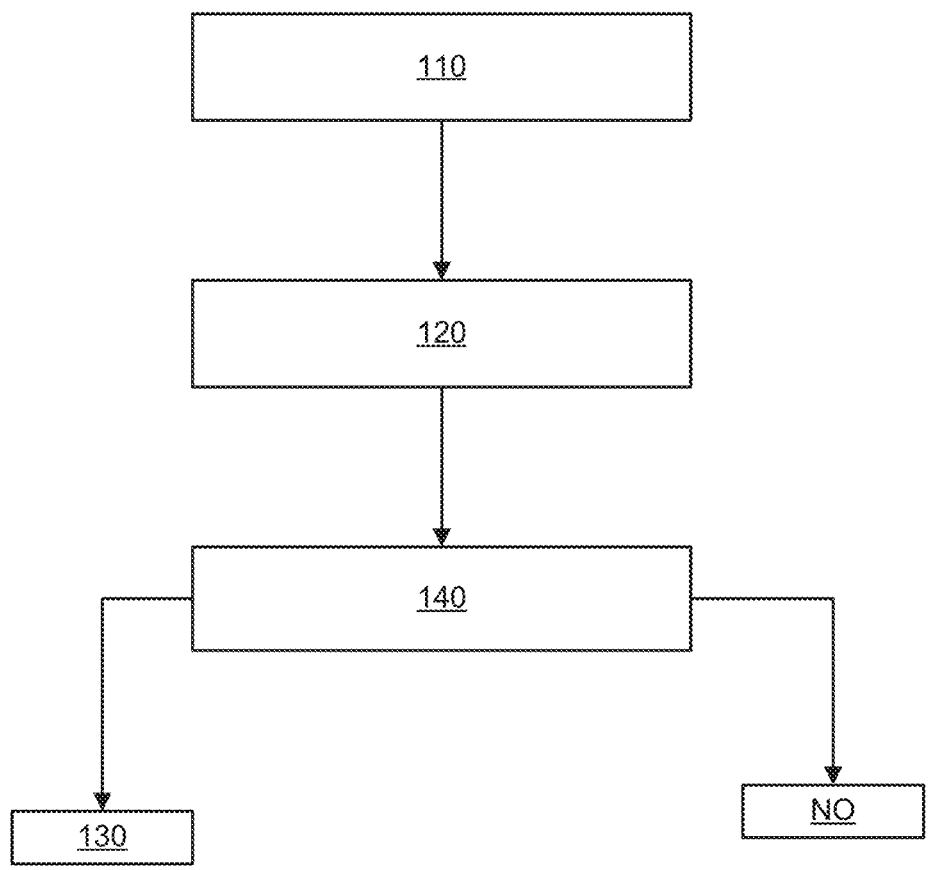
FIG. 4C is an example of a method.

FIG. 4C illustrates method 103 for providing an in-vehicle indication.

Method 103 start by step 110 of obtaining, during a driving session of a vehicle, external audio information about audio generated outside the vehicle.

Step 110 may be followed by step 120 of determining whether the audio generated outside the vehicle includes driving affecting audio.

Step 120 may be followed by step 140 of determining whether to generate the in-vehicle indication.

Step 140 may include determining not to generate the in-vehicle indication based on a relevancy of the generated in-vehicle indication.

For example—step 140 may determine not to generate the in-vehicle indication when the driving affecting audio is heard (or at least sufficiently heard) by the driver. What amounts to sufficiently heard can be determined in any manner—for example be of at least a predefined volume, exhibit at least a predefined signal to noise ratio, being noticed by the driver, and the like).

Yet for another example—step 140 may determine not to generate the in-vehicle indication when the vehicle is driving in an autonomous mode.

Step 140 may be followed by step 130 when determining to generate the in-vehicle indication. Step 140 may be followed by step 134 of FIG. 4C, and the like.

Low Power Generation of Signatures

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration. By determining, per iteration, which spanning elements (of that iteration) are relevant—and reducing the power consumption of irrelevant spanning elements—a significant amount of power may be saved.

In many cases, most of the spanning elements of an iteration are irrelevant—thus after determining (by the spanning elements) their relevancy—the spanning elements that are deemed to be irrelevant may be shut down a/or enter an idle mode.

FIG. 1A illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:

Step 5020 of performing a k'th iteration expansion process (k may be a variable that is used to track the number of iterations).

Step 5030 of performing a k'th iteration merge process.

Step 5040 of changing the value of k.

Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration)—the merge result of the previous iteration is an input to the current iteration expansion process.

At least some of the K iterations involve selectively reducing the power consumption of some spanning elements (during step 5020) that are deemed to be irrelevant.

Figure 1B:
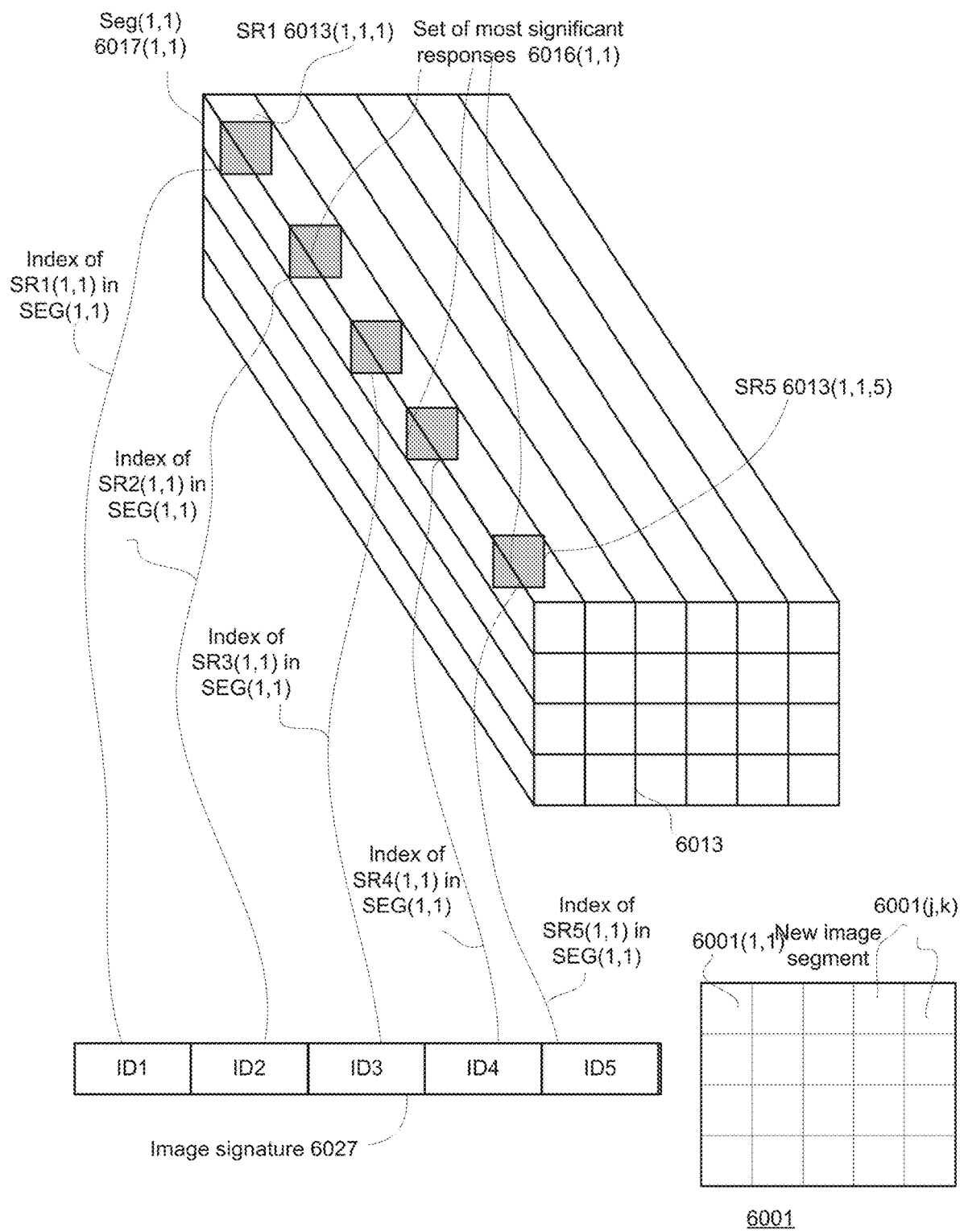
FIG. 1B illustrates an example of a signature.

FIG. 1B is an example of an image signature 6027 of a media unit that is an image 6000 and of an outcome 6013 of the last (K'th) iteration.

The image 6001 is virtually segments to segments 6000 ($i,k$). The segments may be of the same shape and size but this is not necessarily so.

Outcome 6013 may be a tensor that includes a vector of values per each segment of the media unit. One or more objects may appear in a certain segment. For each object—an object identifier (of the signature) points to locations of significant values, within a certain vector associated with the certain segment.

For example—a top left segment (6001(1,1)) of the image may be represented in the outcome 6013 by a vector V(1,1) 6017(1,1) that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may be selected in any other manner.

FIG. 1B illustrates a set of significant responses 6015(1,1) of vector V(1,1) 6017(1,1). The set includes five significant values (such as first significant value SV1(1,1) 6013(1,1,1), second significant value SV2(1,1), third significant value SV3(1,1), fourth significant value SV4(1,1), and fifth significant value SV5(1,1) 6013(1,1,5).

The image signature 6027 includes five indexes for the retrieval of the five significant values—first till fifth identifiers ID1-ID5 are indexes for retrieving the first till fifth significant values.

Figure 1C:
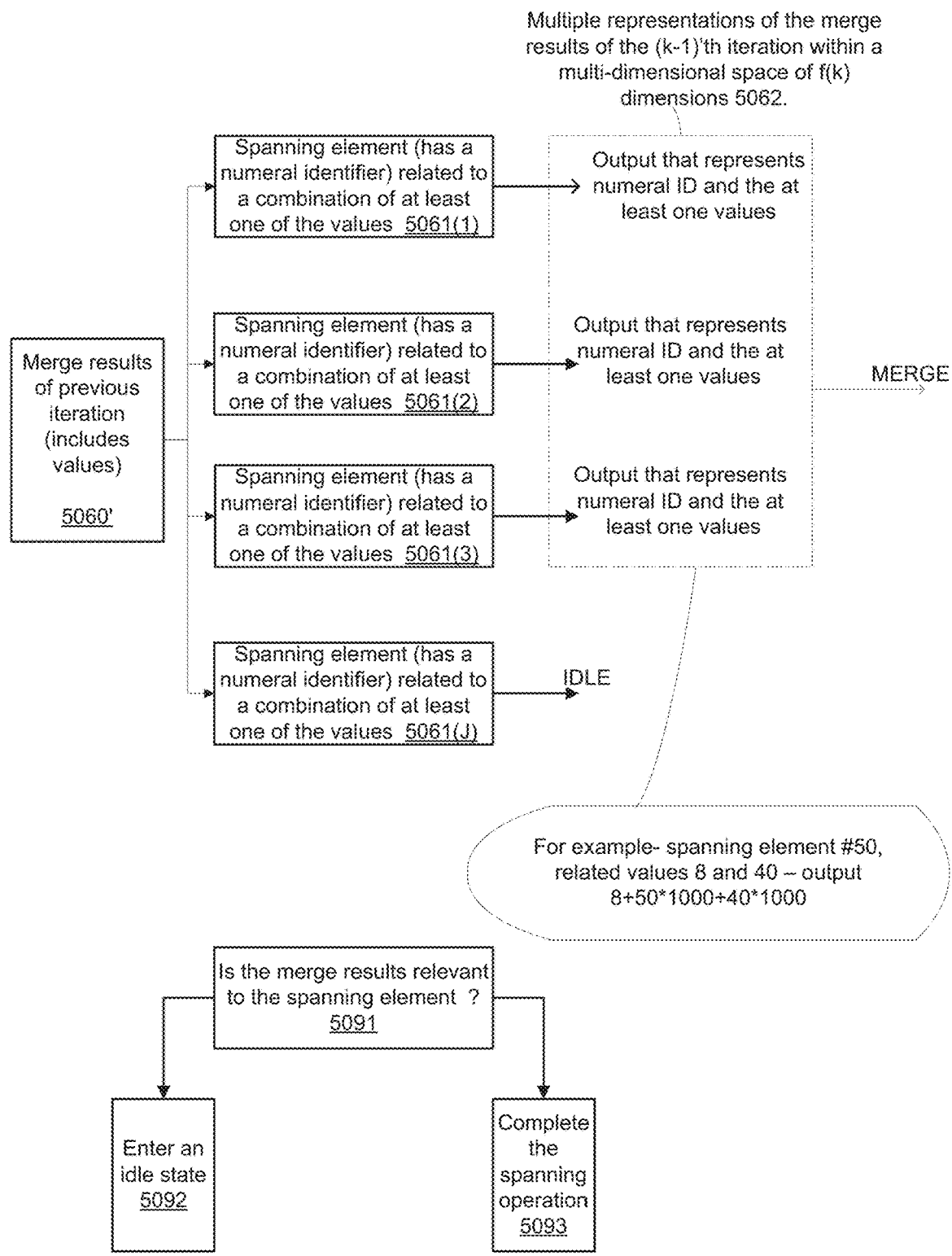
FIG. 1C illustrates an example of a dimension expansion process.

FIG. 1C illustrates a k'th iteration expansion process.

The k'th iteration expansion process start by receiving the merge results 5060' of a previous iteration.

The merge results of a previous iteration may include values are indicative of previous expansion processes—for example—may include values that are indicative of relevant spanning elements from a previous expansion operation, values indicative of relevant regions of interest in a multidimensional representation of the merge results of a previous iteration.

The merge results (of the previous iteration) are fed to spanning elements such as spanning elements 5061(1)-5061(J).

Each spanning element is associated with a unique set of values. The set may include one or more values. The spanning elements apply different functions that may be orthogonal to each other. Using non-orthogonal functions may increase the number of spanning elements—but this increment may be tolerable.

The spanning elements may apply functions that are decorrelated to each other—even if not orthogonal to each other.

The spanning elements may be associated with different combinations of object identifiers that may "cover" multiple possible media units. Candidates for combinations of object identifiers may be selected in various manners—for example based on their occurrence in various images (such as test images) randomly, pseudo randomly, according to some rules and the like. Out of these candidates the combinations may be selected to be decorrelated, to cover said multiple possible media units and/or in a manner that certain objects are mapped to the same spanning elements.

Each spanning element compares the values of the merge results to the unique set (associated with the spanning element) and if there is a match—then the spanning element is deemed to be relevant. If so—the spanning element completes the expansion operation.

If there is no match—the spanning element is deemed to be irrelevant and enters a low power mode. The low power mode may also be referred to as an idle mode, a standby mode, and the like. The low power mode is termed low power because the power consumption of an irrelevant spanning element is lower than the power consumption of a relevant spanning element.

In FIG. 1C various spanning elements are relevant (5061(1)-5061(3)) and one spanning element is irrelevant (5061(J)).

Each relevant spanning element may perform a spanning operation that includes assigning an output value that is indicative of an identity of the relevant spanning elements of the iteration. The output value may also be indicative of identities of previous relevant spanning elements (from previous iterations).

For example—assuming that spanning element number fifty is relevant and is associated with a unique set of values of eight and four—then the output value may reflect the numbers fifty, four and eight—for example one thousand multiplied by (fifty+forty) plus forty. Any other mapping function may be applied.

FIG. 1C also illustrates the steps executed by each spanning element:

Checking if the merge results are relevant to the spanning element (step 5091).

If—so—completing the spanning operation (step 5093).

If not—entering an idle state (step 5092).

FIG. 1D is an example of various merge operations.

A merge operation may include finding regions of interest. The regions of interest are regions within a multidimensional representation of the sensed information. A region of interest may exhibit a more significant response (for example a stronger, higher intensity response).

The merge operation (executed during a k'th iteration merge operation) may include at least one of the following:

Step 5031 of searching for overlaps between regions of interest (of the k'th iteration expansion operation results) and define regions of interest that are related to the overlaps.

Step 5032 of determining to drop one or more region of interest, and dropping according to the determination.

Step 5033 of searching for relationships between regions of interest (of the k'th iteration expansion operation results) and define regions of interest that are related to the relationship.

Step 5034 of searching for proximate regions of interest (of the k'th iteration expansion operation results) and define regions of interest that are related to the proximity Proximate may be a distance that is a certain fraction (for example less than 1%) of the multi-dimensional space, may be a certain fraction of at least one of the regions of interest that are tested for proximity.

Step 5035 of searching for relationships between regions of interest (of the k'th iteration expansion operation results) and define regions of interest that are related to the relationship.

Step 5036 of merging and/or dropping k'th iteration regions of interest based on shape information related to shape of the k'th iteration regions of interest.

The same merge operations may applied in different iterations.

Alternatively, different merge operations may be executed during different iterations.

Figure 1E:
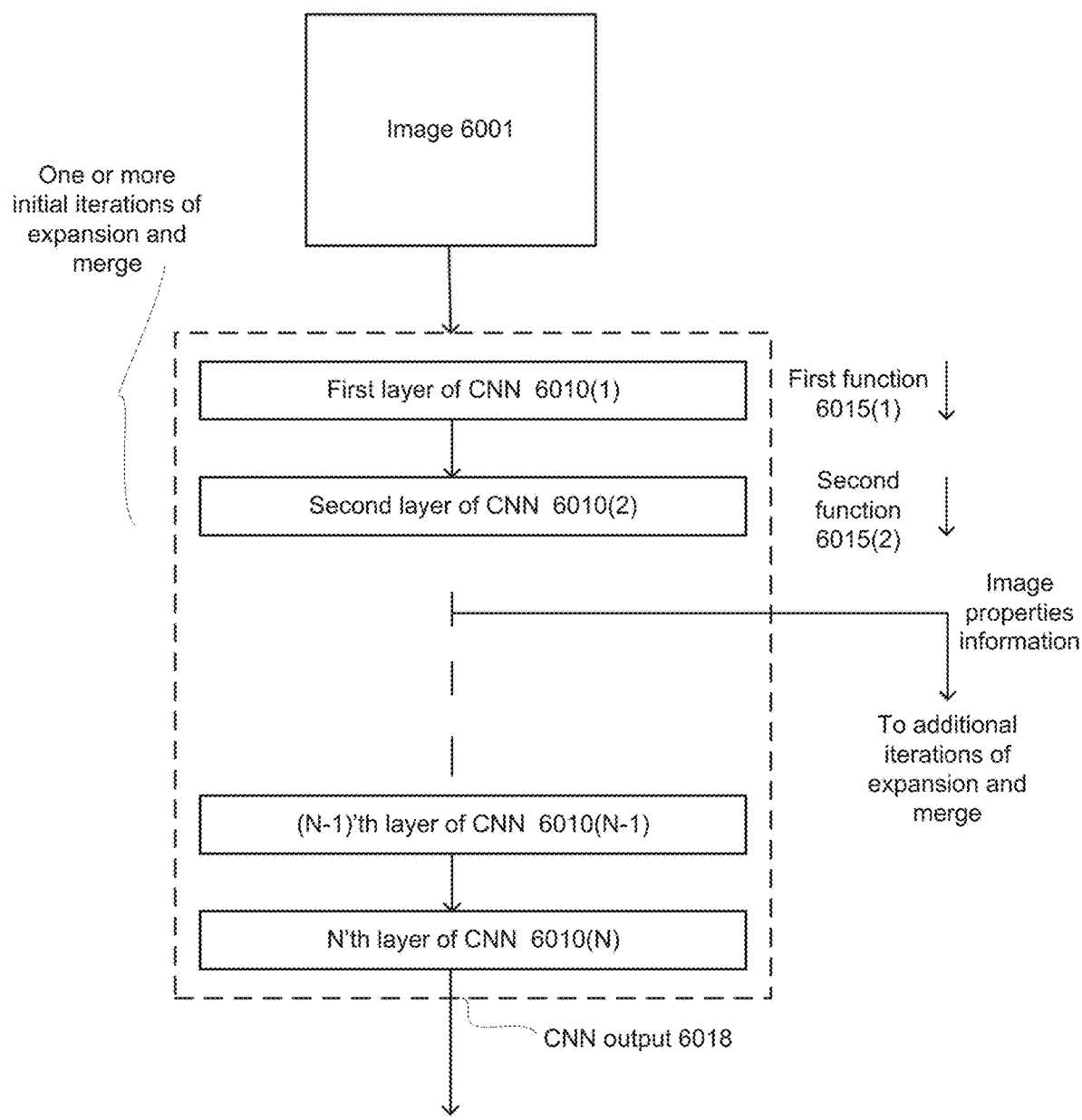
FIG. 1E illustrates an example of hybrid process.

FIG. 1E illustrates an example of a hybrid process and an input image 6001.

The hybrid process is hybrid in the sense that some expansion and merge operations are executed by a convolutional neural network (CNN) and some expansion and merge operations (denoted additional iterations of expansion and merge) are not executed by the CNN— but rather by a process that may include determining a relevancy of spanning elements and entering irrelevant spanning elements to a low power mode.

In FIG. 1E one or more initial iterations are executed by first and second CNN layers 6010(1) and 6010(2) that apply first and second functions 6015(1) and 6015(2).

The output of these layers provided information about image properties. The image properties may not amount to object detection. Image properties may include location of edges, properties of curves, and the like.

The CNN may include additional layers (for example third till N'th layer 6010(N)) that may provide a CNN output 6018 that may include object detection information. It should be noted that the additional layers may not be included.

It should be noted that executing the entire signature generation process by a hardware CNN of fixed connectivity may have a higher power consumption—as the CNN will not be able to reduce the power consumption of irrelevant nodes.

Figure 1F:
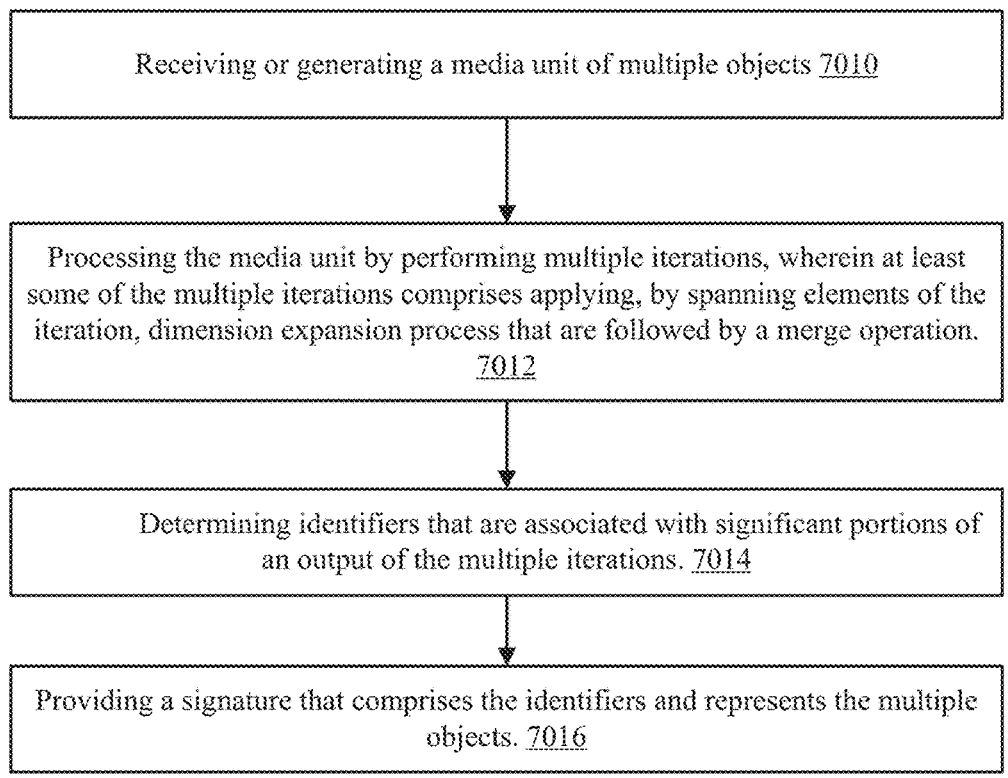
FIG. 1F illustrates an example of a method.

FIG. 1F illustrates a method 7000 for low-power calculation of a signature.

Method 7000 starts by step 7010 of receiving or generating a media unit of multiple objects.

Step 7010 may be followed by step 7012 of processing the media unit by performing multiple iterations, wherein at least some of the multiple iterations comprises applying, by spanning elements of the iteration, dimension expansion process that are followed by a merge operation.

The applying of the dimension expansion process of an iteration may include (a) determining a relevancy of the spanning elements of the iteration; and (b) completing the dimension expansion process by relevant spanning elements of the iteration and reducing a power consumption of irrelevant spanning elements until, at least, a completion of the applying of the dimension expansion process.

The identifiers may be retrieval information for retrieving the significant portions.

The at least some of the multiple iterations may be a majority of the multiple iterations.

The output of the multiple iteration may include multiple property attributes for each segment out of multiple segments of the media unit; and wherein the significant portions of an output of the multiple iterations may include more impactful property attributes.

The first iteration of the multiple iteration may include applying the dimension expansion process by applying different filters on the media unit.

The at least some of the multiple iteration exclude at least a first iteration of the multiple iterations. See, for example, FIG. 1E.

The determining the relevancy of the spanning elements of the iteration may be based on at least some identities of relevant spanning elements of at least one previous iteration.

The determining the relevancy of the spanning elements of the iteration may be based on at least some identities of relevant spanning elements of at least one previous iteration that preceded the iteration.

The determining the relevancy of the spanning elements of the iteration may be based on properties of the media unit.

The determining the relevancy of the spanning elements of the iteration may be performed by the spanning elements of the iteration.

Method 7000 may include a neural network processing operation that may be executed by one or more layers of a neural network and does not belong to the at least some of the multiple iterations. See, for example, FIG. 1E.

The at least one iteration may be executed without reducing power consumption of irrelevant neurons of the one or more layers.

The one or more layers may output information about properties of the media unit, wherein the information differs from a recognition of the multiple objects.

The applying, by spanning elements of an iteration that differs from the first iteration, the dimension expansion process may include assigning output values that may be indicative of an identity of the relevant spanning elements of the iteration. See, for example, FIG. 1C.

The applying, by spanning elements of an iteration that differs from the first iteration, the dimension expansion process may include assigning output values that may be indicative a history of dimension expansion processes until the iteration that differs from the first iteration.

The each spanning element may be associated with a subset of reference identifiers. The determining of the relevancy of each spanning elements of the iteration may be based a relationship between the subset of the reference identifiers of the spanning element and an output of a last merge operation before the iteration.

The output of a dimension expansion process of an iteration may be a multidimensional representation of the media unit that may include media unit regions of interest that may be associated with one or more expansion processes that generated the regions of interest.

The merge operation of the iteration may include selecting a subgroup of media unit regions of interest based on a spatial relationship between the subgroup of multidimensional regions of interest.

Method 7000 may include applying a merge function on the subgroup of multidimensional regions of interest. See, for example, FIG. 1C.

Method 7000 may include applying an intersection function on the subgroup of multidimensional regions of interest. See, for example, FIG. 1C.

The merge operation of the iteration may be based on an actual size of one or more multidimensional regions of interest.

The merge operation of the iteration may be based on relationship between sizes of the multidimensional regions of interest. For example—larger multidimensional regions of interest may be maintained while smaller multidimensional regions of interest may be ignored of.

The merge operation of the iteration may be based on changes of the media unit regions of interest during at least the iteration and one or more previous iteration.

Step 7012 may be followed by step 7014 of determining identifiers that are associated with significant portions of an output of the multiple iterations.

Step 7014 may be followed by step 7016 of providing a signature that comprises the identifiers and represents the multiple objects.

Localization and Segmentation

Any of the mentioned above signature generation method provides a signature that does not explicitly includes accurate shape information. This adds to the robustness of the signature to shape related inaccuracies or to other shape related parameters.

The signature includes identifiers for identifying media regions of interest.

Each media region of interest may represent an object (for example a vehicle, a pedestrian, a road element, a human made structure, wearables, shoes, a natural element such as a tree, the sky, the sun, and the like) or a part of an object (for example—in the case of the pedestrian—a neck, a head, an arm, a leg, a thigh, a hip, a foot, an upper arm, a forearm, a wrist, and a hand). It should be noted that for object detection purposes a part of an object may be regarded as an object.

The exact shape of the object may be of interest.

Figure 1G:
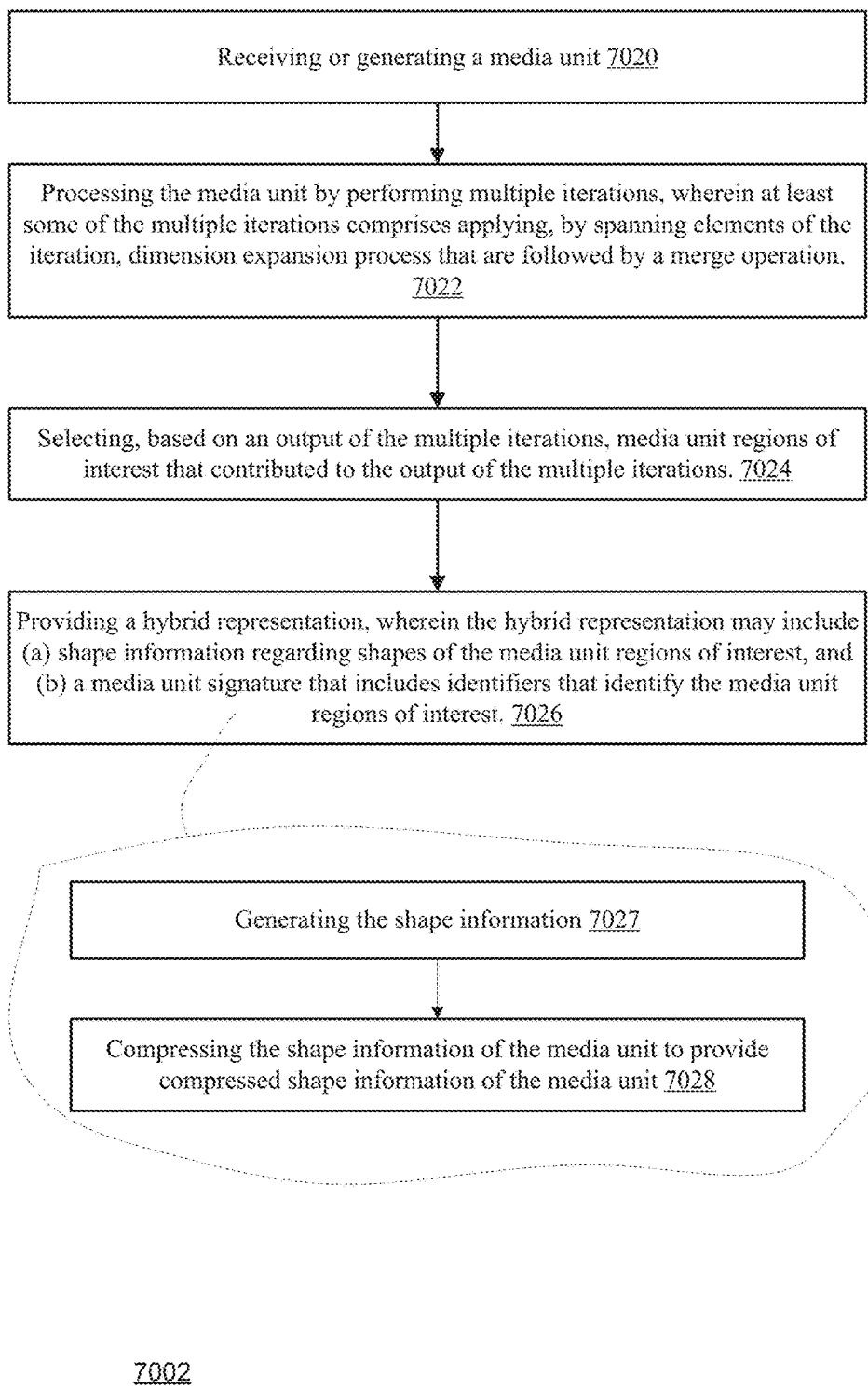
FIG. 1G illustrates an example of a method.

FIG. 1G illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

Figure 1H:
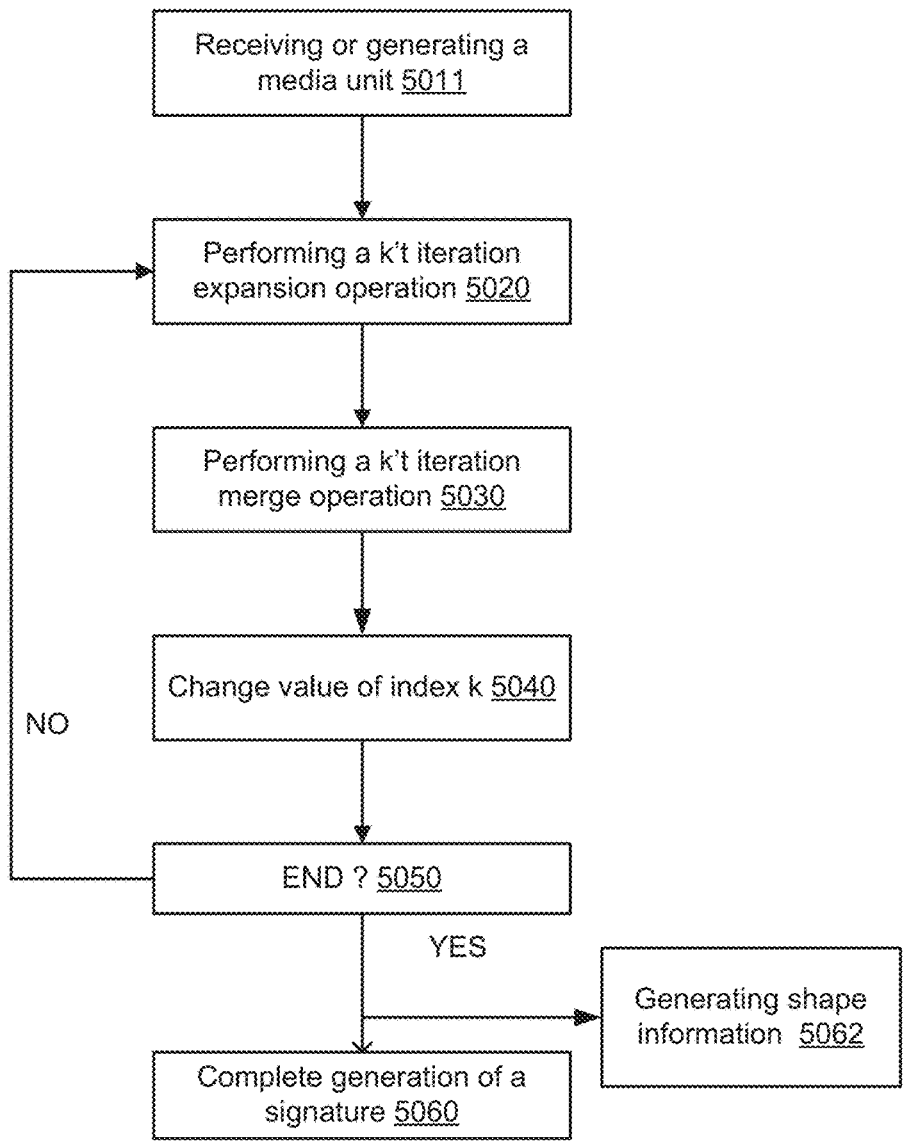
FIG. 1H illustrates an example of a method.

FIG. 1H illustrates method 5002 for generating a hybrid representation of a media unit.

Method 5002 may start by step 5011 of receiving or generating a media unit.

Step 5011 may be followed by processing the media unit by performing multiple iterations, wherein at least some of the multiple iterations comprises applying, by spanning elements of the iteration, dimension expansion process that are followed by a merge operation.

The processing may be followed by steps 5060 and 5062.

The processing may include steps 5020, 5030, 5040 and 5050.

Step 5020 may include performing a k'th iteration expansion process (k may be a variable that is used to track the number of iterations).

Step 5030 may include performing a k'th iteration merge process.

Step 5040 may include changing the value of k.

Step 5050 may include checking if all required iterations were done—if so proceeding to steps 5060 and 5062. Else—jumping to step 5020.

The output of step 5020 is a k'th iteration expansion result.

The output of step 5030 is a k'th iteration merge result.

For each iteration (except the first iteration)—the merge result of the previous iteration is an input to the current iteration expansion process.

Step 5060 may include completing the generation of the signature.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Object Detection Using Compressed Shape Information

Object detection may include comparing a signature of an input image to signatures of one or more cluster structures in order to find one or more cluster structures that include one or more matching signatures that match the signature of the input image.

The number of input images that are compared to the cluster structures may well exceed the number of signatures of the cluster structures. For example—thousands, tens of thousands, hundreds of thousands (and even more) of input signature may be compared to much less cluster structure signatures. The ratio between the number of input images to the aggregate number of signatures of all the cluster structures may exceed ten, one hundred, one thousand, and the like.

In order to save computational resources, the shape information of the input images may be compressed.

On the other hand—the shape information of signatures that belong to the cluster structures may be uncompressed—and of higher accuracy than those of the compressed shape information.

When the higher quality is not required—the shape information of the cluster signature may also be compressed.

Compression of the shape information of cluster signatures may be based on a priority of the cluster signature, a popularity of matches to the cluster signatures, and the like.

The shape information related to an input image that matches one or more of the cluster structures may be calculated based on shape information related to matching signatures.

For example—a shape information regarding a certain identifier within the signature of the input image may be determined based on shape information related to the certain identifiers within the matching signatures.

Any operation on the shape information related to the certain identifiers within the matching signatures may be applied in order to determine the (higher accuracy) shape information of a region of interest of the input image identified by the certain identifier.

For example—the shapes may be virtually overlaid on each other and the population per pixel may define the shape.

For example—only pixels that appear in at least a majority of the overlaid shaped should be regarded as belonging to the region of interest.

Other operations may include smoothing the overlaid shapes, selecting pixels that appear in all overlaid shapes.

The compressed shape information may be ignored of or be taken into account.

Figure 1I:
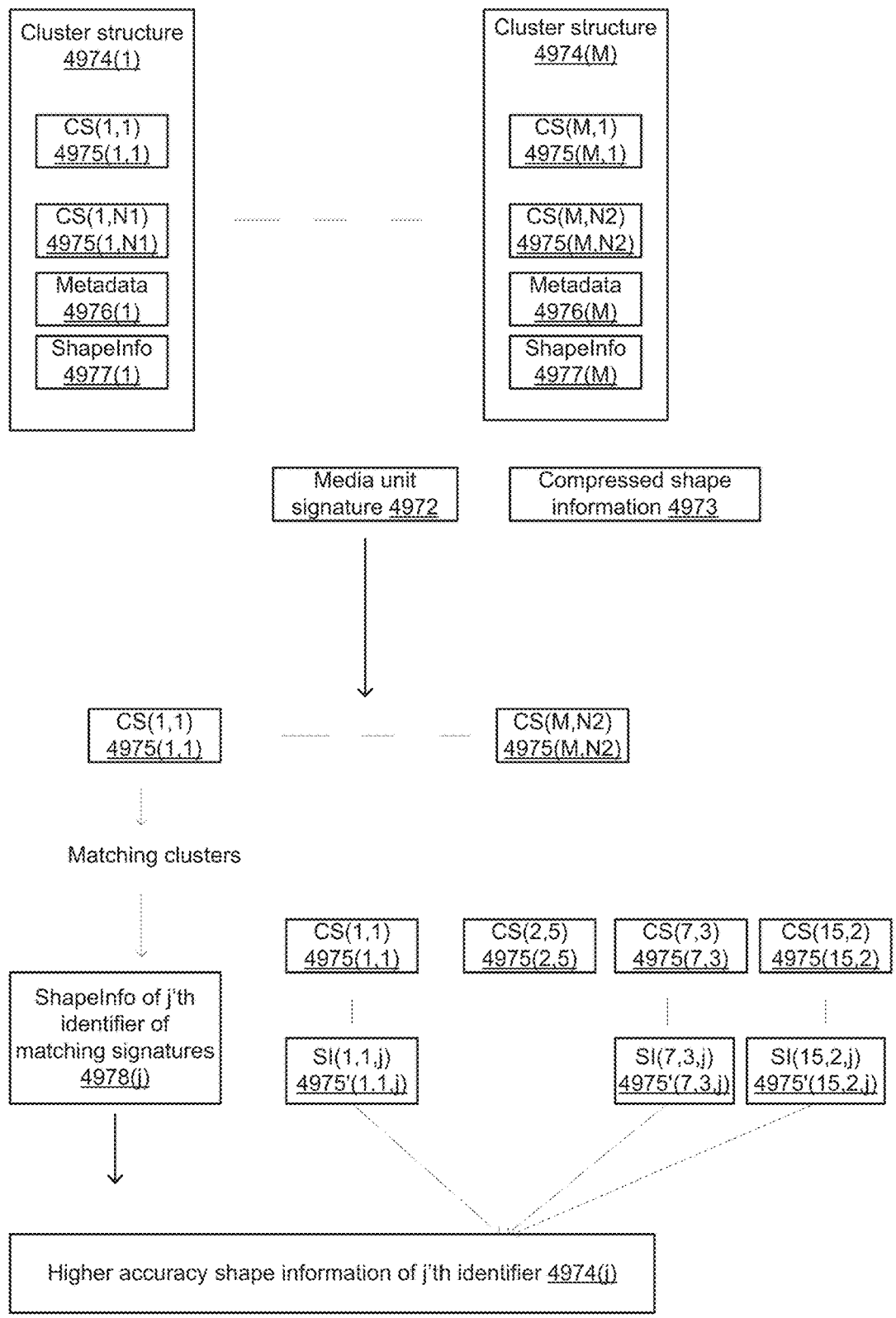
FIG. 1I illustrates an example of a method.

FIG. 1I illustrates a matching process and a generation of a higher accuracy shape information.

It is assumed that there are multiple (M) cluster structures 4974(1)-4974(M). Each cluster structure includes cluster signatures, metadata regarding the cluster signatures, and shape information regarding the regions of interest identified by identifiers of the cluster signatures.

For example—first cluster structure 4974(1) includes multiple (N1) signatures (referred to as cluster signatures CS) CS(1,1)-CS(1,N1) 4975(1,1)-4975(1,N1), metadata 4976(1), and shape information (Shapeinfo 4977(1)) regarding shapes of regions of interest associated with identifiers of the CSs.

Yet for another example—M'th cluster structure 4974(M) includes multiple (N2) signatures (referred to as cluster signatures CS) CS(M,1)-CS(M,N2) 4975(M,1)-4975(M, N2), metadata 4976(M), and shape information (Shapeinfo 4977(M)) regarding shapes of regions of interest associated with identifiers of the CSs.

The number of signatures per concept structure may change over time—for example due to cluster reduction attempts during which a CS is removed from the structure to provide a reduced cluster structure, the reduced structure is checked to determine that the reduced cluster signature may still identify objects that were associated with the (non-reduced) cluster signature—and if so the signature may be reduced from the cluster signature.

The signatures of each cluster structures are associated to each other, wherein the association may be based on similarity of signatures and/or based on association between metadata of the signatures.

Assuming that each cluster structure is associated with a unique object—then objects of a media unit may be identified by finding cluster structures that are associated with said objects. The finding of the matching cluster structures may include comparing a signature of the media unit to signatures of the cluster structures- and searching for one or more matching signature out of the cluster signatures.

In FIG. 1I—a media unit having a hybrid representation undergoes object detection. The hybrid representation includes media unit signature 4972 and compressed shape information 4973.

The media unit signature 4972 is compared to the signatures of the M cluster structures—from CS(1,1) 4975(1,1) till CS(M,N2) 4975(M,N2).

We assume that one or more cluster structures are matching cluster structures.

Once the matching cluster structures are found the method proceeds by generating shape information that is of higher accuracy then the compressed shape information.

The generation of the shape information is done per identifier.

For each j that ranges between 1 and J (J is the number of identifiers per the media unit signature 4972) the method may perform the steps of:

Find (step 4978(j)) the shape information of the j'th identifier of each matching signature- or of each signature of the matching cluster structure.

Generate (step 4979(j)) a higher accuracy shape information of the j'th identifier.

For example—assuming that the matching signatures include CS(1,1) 2975(1,1), CS(2,5) 2975(2,5), CS(7,3) 2975 (7,3) and CS(15,2) 2975(15,2), and that the j'th identifier is included in CS(1,1) 2975(1,1),CS(7,3) 2975(7,3) and CS(15,2) 2975(15,2)—then the shape information of the j'th identifier of the media unit is determined based on the shape information associated with CS(1,1) 2975(1,1),CS(7,3) 2975(7,3) and CS(15,2) 2975(15,2).

FIG. 1P illustrates an image 8000 that includes four regions of interest 8001, 8002, 8003 and 8004. The signature 8010 of image 8000 includes various identifiers including ID1 8011, ID2 8012, ID3 8013 and ID4 8014 that identify the four regions of interest 8001, 8002, 8003 and 8004.

The shapes of the four regions of interest 8001, 8002, 8003 and 8004 are four polygons. Accurate shape information regarding the shapes of these regions of interest may be generated during the generation of signature 8010.

Figure 1J:
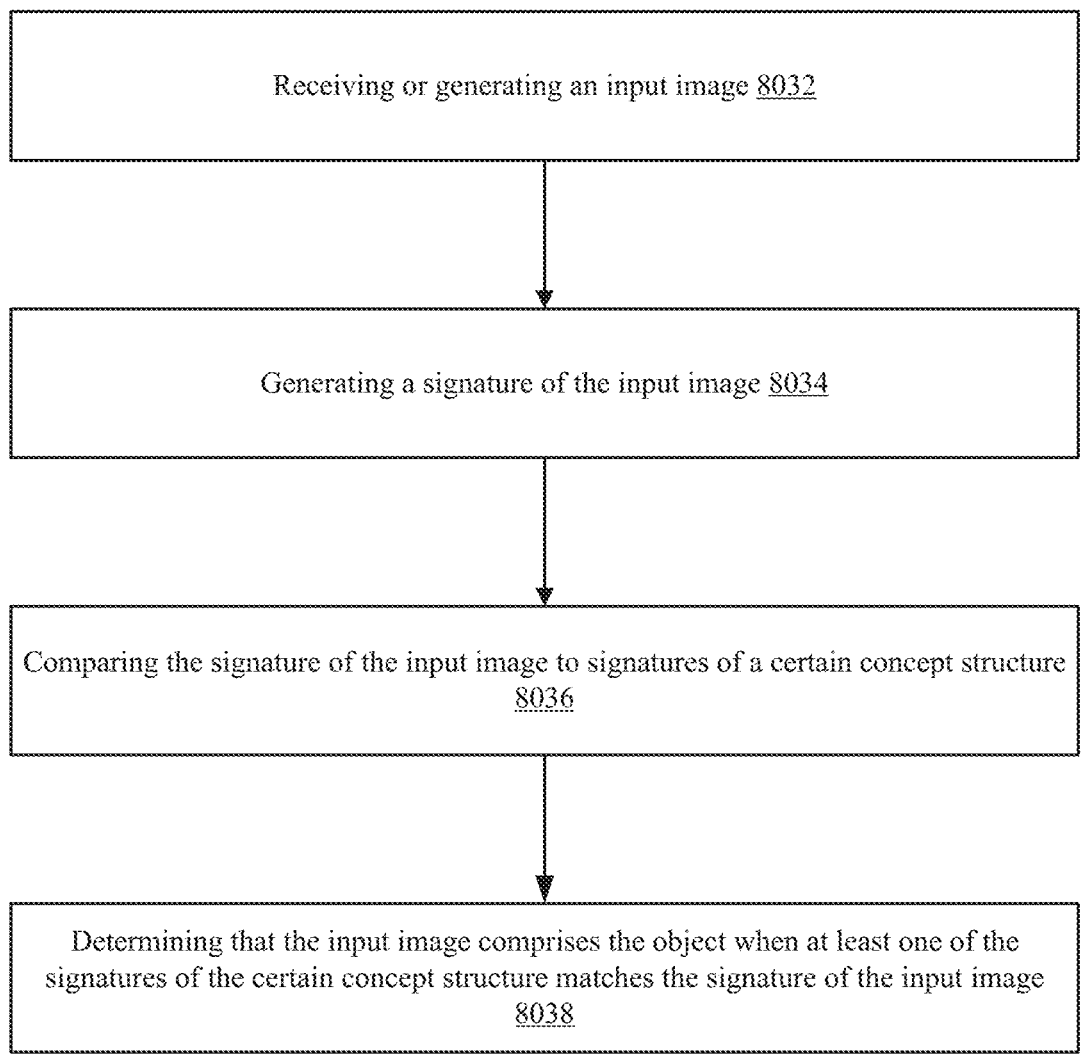
FIG. 1J illustrates an example of a method.

FIG. 1J illustrates method 8030 for object detection.

Method 8030 may include the steps of method 8020 or may be preceded by steps 8022, 8024 and 8026.

Method 8030 may include a sequence of steps 8032, 8034, 8036 and 8038.

Step 8032 may include receiving or generating an input image.

Step 8034 may include generating a signature of the input image.

Step 8036 may include comparing the signature of the input image to signatures of a certain concept structure. The certain concept structure may be generated by method 8020.

Step 8038 may include determining that the input image comprises the object when at least one of the signatures of the certain concept structure matches the signature of the input image.

FIG. 2D illustrates method 8040 for object detection.

Method 8040 may include the steps of method 8020 or may be preceded by steps 8022, 8024 and 8026.

Method 8040 may include a sequence of steps 8041, 8043, 8045, 8047 and 8049.

Step 8041 may include receiving or generating an input image.

Step 8043 may include generating a signature of the input image, the signature of the input image comprises only some of the certain second image identifiers; wherein the input image of the second scale.

Step 8045 may include changing a scale of the input image to the first scale to a provide an amended input image.

Step 8047 may include generating a signature of the amended input image.

Step 8049 may include verifying that the input image comprises the object when the signature of the amended input image comprises the at least one certain first image identifier.

Object Detection that is Robust to Angle of Acquisition

Object detection may benefit from being robust to the angle of acquisition—to the angle between the optical axis of an image sensor and a certain part of the object. This allows the detection process to be more reliable, use fewer different clusters (may not require multiple clusters for identifying the same object from different images).

Figure 1K:
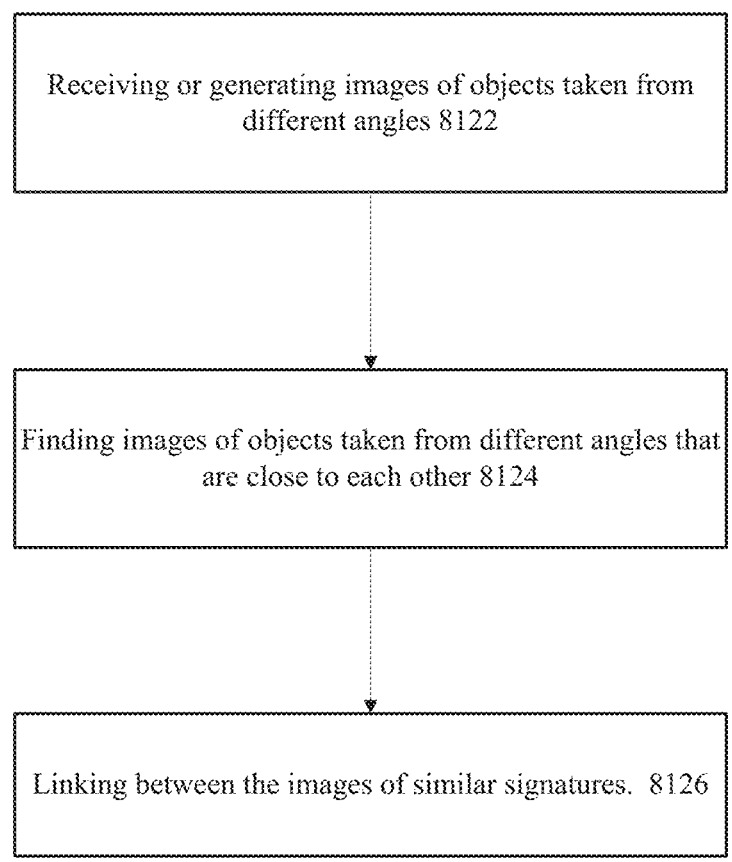
FIG. 1K illustrates an example of a method.

FIG. 1K illustrates method 8120 that includes the following steps:

Step 8122 of receiving or generating images of objects taken from different angles.

Step 8124 of finding images of objects taken from different angles that are close to each other. Close enough may be less than 1,5,10,15 and 20 degrees—but the closeness may be better reflected by the reception of substantially the same signature.

Step 8126 of linking between the images of similar signatures. This may include searching for local similarities. The similarities are local in the sense that they are calculated per a subset of signatures. For example—assuming that the similarity is determined per two images—then a first signature may be linked to a second signature that is similar to the first image. A third signature may be linked to the second image based on the similarity between the second and third signatures- and even regardless of the relationship between the first and third signatures.

Step 8126 may include generating a concept data structure that includes the similar signatures.

This so-called local or sliding window approach, in addition to the acquisition of enough images (that will statistically provide a large angular coverage) will enable to generate a concept structure that include signatures of an object taken at multiple directions.

Signature Tailored Matching Threshold

Object detection may be implemented by (a) receiving or generating concept structures that include signatures of media units and related metadata, (b) receiving a new media unit, generating a new media unit signature, and (c) comparing the new media unit signature to the concept signatures of the concept structures.

The comparison may include comparing new media unit signature identifiers (identifiers of objects that appear in the new media unit) to concept signature identifiers and determining, based on a signature matching criteria whether the new media unit signature matches a concept signature. If such a match is found then the new media unit is regarded as including the object associated with that concept structure.

It was found that by applying an adjustable signature matching criteria, the matching process may be highly effective and may adapt itself to the statistics of appearance of identifiers in different scenarios. For example—a match may be obtained when a relatively rear but highly distinguishing identifier appears in the new media unit signature and in a cluster signature, but a mismatch may be declared when multiple common and slightly distinguishing identifiers appear in the new media unit signature and in a cluster signature.

Figure 1L:
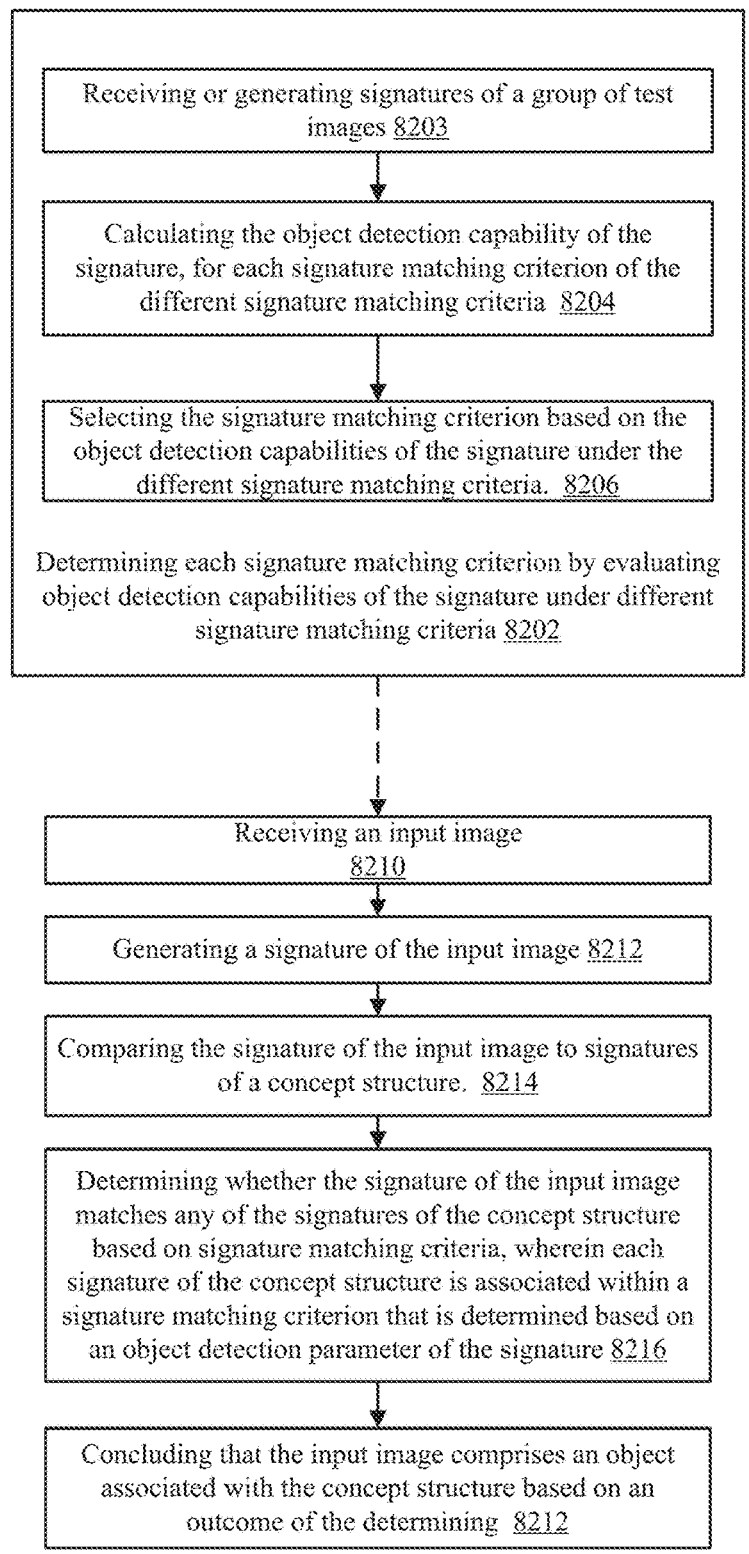
FIG. 1L illustrates an example of a method.
Figure 1M:
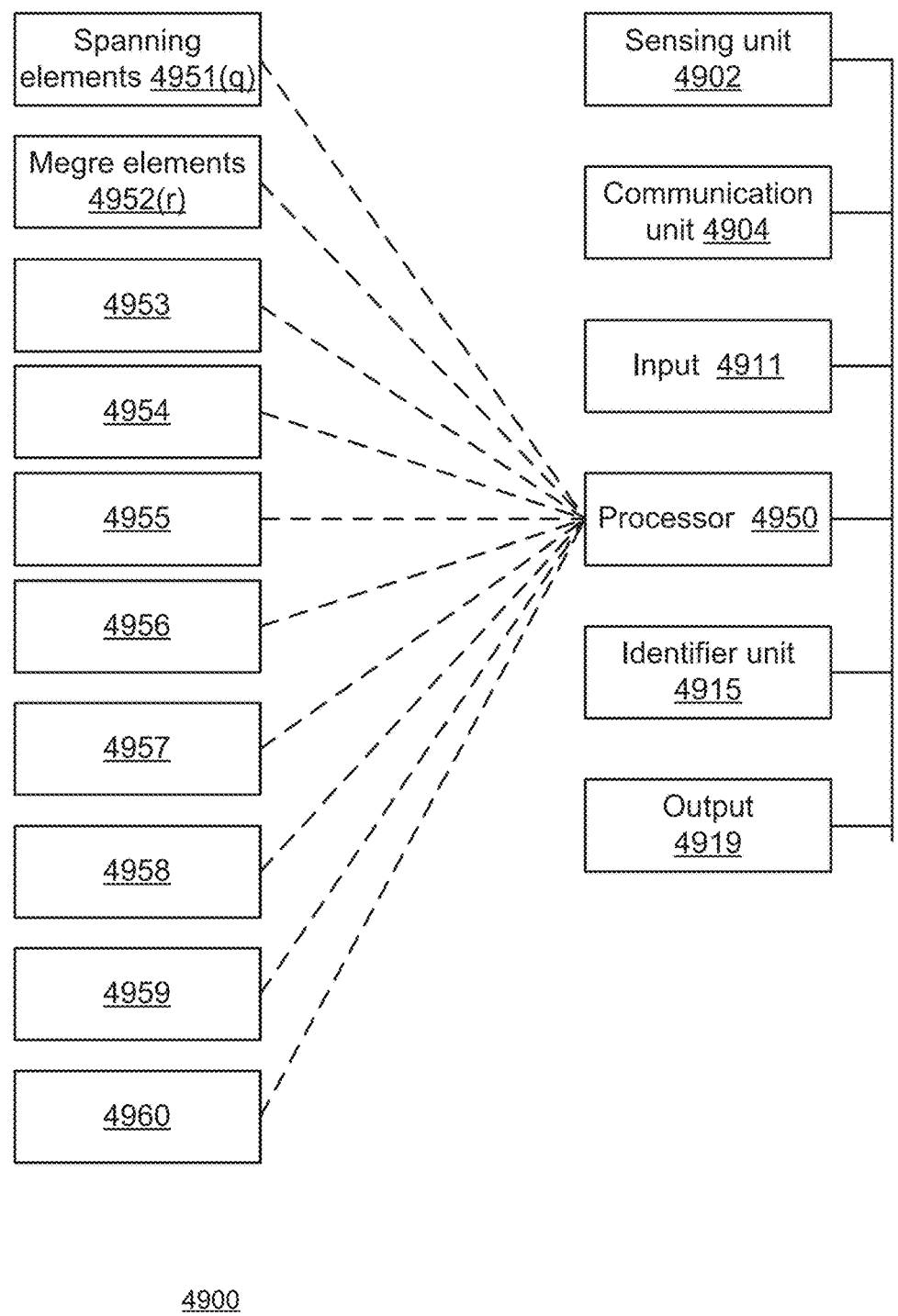
FIG. 1M illustrates an example of a system.

FIG. 1L illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that an signature of the input image may match multiple cluster structures. Method 8200 is applicable to all of the matching processes- and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

For example, referring to FIG. 1I, cluster signatures CS(1,1), CS(2,5), CS(7,3) and CS(15,2) match unit signature 4972. Each of these matches may apply a unique signature matching criterion.

Examples of Systems

FIG. 21M illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, one or more processors—such as processor 4950, and output 4919. The communication unit 4904 may include the input and/or the output. The communication unit 4904 may communicate with any entity—within the vehicle (for example driver device, passenger device, multimedia device), outside the vehicle (another vehicle, another computerized system—such as out-of-vehicle computerized system 4820 of FIG. 1N, another road user, another human outside the vehicle), and the like.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of (and thus may not include at least one out of):

Multiple spanning elements 4951(*q*).

Multiple merge elements 4952(*r*).

Object detector 4953.

Cluster manager 4954.

Controller 4955.

Selection unit 4956.

Object detection determination unit 4957.

Signature generator 4958.

Movement information unit 4959.

Identifier unit 4960.

While system 4900 includes a sensing unit 4902—is should be noted that it may receive sensed information from other sensors and/or that the sensing unit does not belong to the system. The system may receive information from one or more sensors located in the vehicle, associated with the vehicle, and/or located outside the vehicle.

Any method illustrated in the specification may be fully or partially executed by system 4900, and/or may be fully or partially executed by one or more other computerized system, and/or by one or more computerized systems—for example by task allocations between computerized systems, by a cooperation (for example—exchange of information, exchange of decisions, any allocation of resources, collaborative decision, and the like) between multiple computerized systems.

Figure 1N:
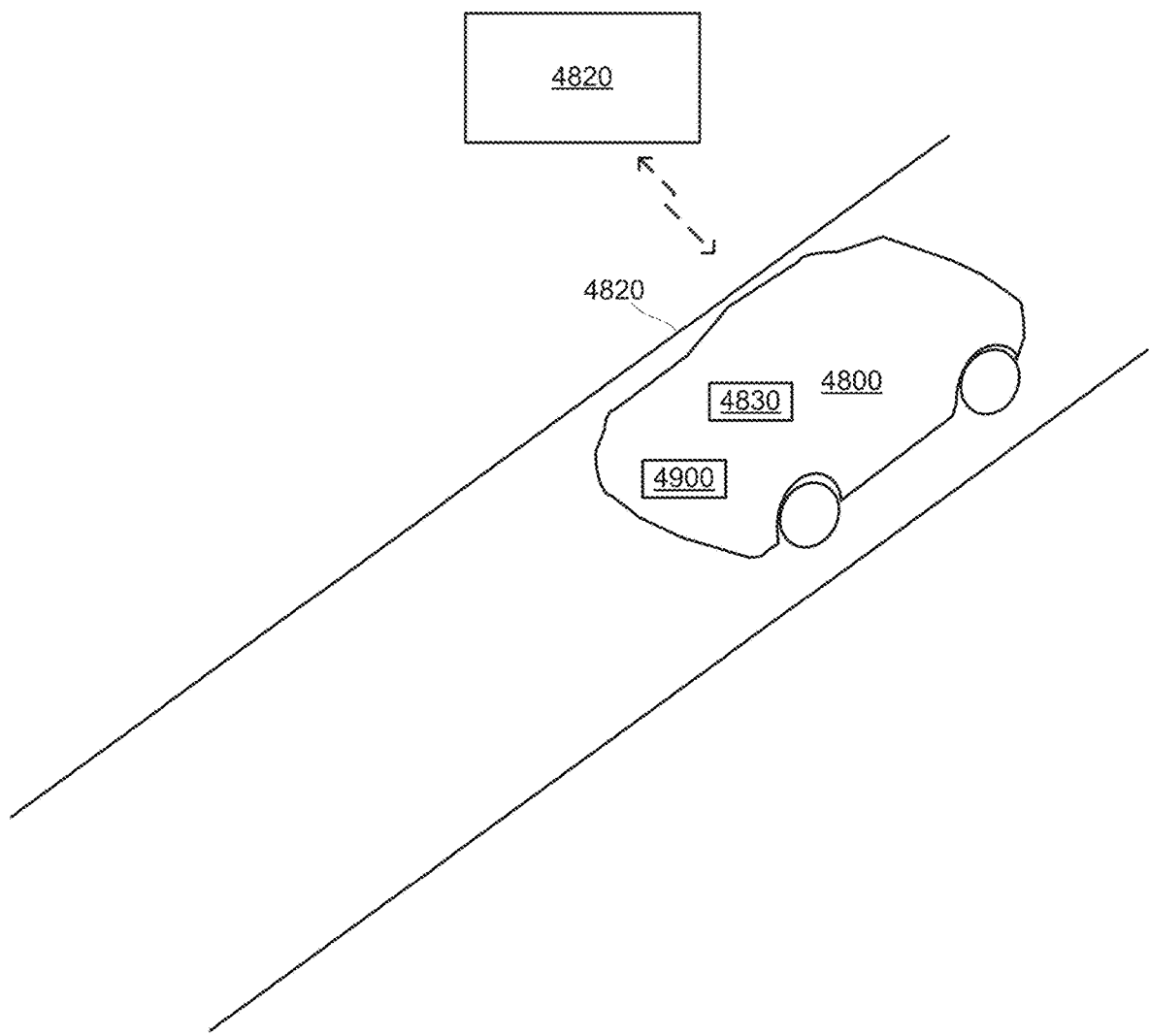
FIG. 1N is a partly-pictorial, partly-block diagram illustration of an exemplary obstacle detection and mapping system, constructed and operative in accordance with embodiments described herein.

The one or more other computerized systems may be, for example, out-of-vehicle computerized system 4820 of FIG. 1N, any other out-of-vehicle computerized system, one or more other in-vehicle systems, a computerized device of a person within the vehicle, any computerized system outside the vehicle—including for example a computerized system of another vehicle.

An example of an other in-vehicle system is denoted 4830 in FIG. 1N and is located within vehicle 4800 that drives along road 4820.

System 4900 may obtain sensed information from any type of sensors—a camera, one or more sensors implemented using any suitable imaging technology instead of, or in addition to, a conventional camera, an infrared sensor, a radar, an ultrasound sensor, any electro-optic sensor, a radiography sensor, a LIDAR (light detection and ranging), telemetry ECU sensor, shock sensor, etc.

System 4900 and/or other in-vehicle system is denoted 4830 may use supervised and/or unsupervised learning to perform any method executed by them.

The other in-vehicle system 4830 may be an autonomous driving system, an advance driver assistance system, or may differ from an autonomous driving system and from an advance driver assistance system.

The other in-vehicle system 4830 may include processing circuitry 210, input/output (I/O) module 220, one or more sensors 233, and database 270. The processing circuitry 210 may execute any task is it assigned or programmed to perform in relation to any of the methods illustrate din the application. Alternatively—the other in-vehicle system 4830 may include another module for executing (alone or with the processing circuit) any such task. For example—the processing circuitry may execute instructions to provide an autonomous driving manager functionality. Alternatively— another circuit or module of the in-vehicle system 4830 may provide the autonomous driving manager functionality.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for in-vehicle indication management, the method comprises:
   obtaining, during a driving session of a vehicle, audio information about audio generated outside the vehicle;
   determining, at a processor that comprises an integrated circuit, by processing the audio information, whether the audio generated outside the vehicle comprises driving affecting audio;
   estimating, by the processor based on the determining, whether the driving affecting audio is heard within the vehicle; and
   generating, in accordance with the estimating, a driving relevant in-vehicle audio indicative of the driving affecting audio, the generating involves searching, by applying a machine learning process trained to locate the driving affecting audio, for a signature matching between a generated signature of the audio and a generated signature for the driving affecting audio, such that the driving relevant in-vehicle audio is generated, based on the searching, only when the vehicle is driven in a human driving mode, and further in accordance with the estimating, in response to estimating that the driving affecting audio is not being heard within the vehicle.

2. The method according to claim 1 wherein the driving relevant in-vehicle audio is a reconstructed version of the driving affecting audio.

3. The method according to claim 1 wherein the obtaining of the audio information comprising sensing the audio information by at least one external audio sensor.

4. The method according to claim 1 comprising estimating at least one other sound to be generated within the vehicle, when the driving relevant in-vehicle audio is played in the vehicle, wherein the at least one other sound differ from the driving relevant in-vehicle audio.

5. The method according to claim 4 comprising generating the driving relevant in-vehicle audio based on the estimating of the at least one other sound.

6. The method according to claim 4 comprising generating the driving relevant in-vehicle audio to be heard by at least the driver at the presence of the at least one other sound.

7. The method according to claim 4 wherein the at least one other sound is generated by a media device that is located, during the driving session, within the vehicle.

8. The method according to claim 1, further comprising:
generating a signature of the audio information by:
performing a first number of signature generating iterations using a convolutional neural network of fixed connectivity; and
performing additional signature generation iterations that involve deactivating, per each additional signature generation iteration, spanning elements that are irrelevant to the additional signature generation iteration.

9. The method according to claim 1, wherein the generating of the driving relevant in-vehicle audio comprising setting at least a volume of the driving relevant in-vehicle audio based on the driving mode.

10. The method according to claim 1 wherein the determining of whether the audio generated outside the vehicle comprises driving affecting audio is executed by a machine learning process that was trained to detect driving affecting audio.

11. A non-transitory computer readable medium that stores instructions that once executed by a processor that comprises an integrated circuit, cause the processor to:
obtain, during a driving session of a vehicle, audio information about audio generated outside the vehicle;
determine, by processing the audio information, whether the audio generated outside the vehicle comprises driving affecting audio;
estimate, based on the determining, whether the driving affecting audio is heard within the vehicle; and
generate, in accordance with the estimating, a driving relevant in-vehicle audio indicative of the driving affecting audio, by searching using a machine learning process trained to locate the driving affecting audio, for a signature matching between a generated signature for the audio and a generated signature for the driving affecting audio, such that the driving relevant in-vehicle audio is generated only when the vehicle is driven in a human driving mode, and further upon estimating that the driving affecting audio is not being heard within the vehicle.

12. The non-transitory computer readable medium according to claim 11, that further stores instructions that once executed by the processor, causes the processor to:
generating a signature of the audio information by:
performing a first number of signature generating iterations using a convolutional neural network of fixed connectivity; and
performing additional signature generation iterations that involve deactivating, per each additional signature generation iteration, spanning elements that are irrelevant to the additional signature generation iteration; and
searching, by applying a machine learning process trained to locate the driving affecting audio, for a matching signature of the driving affecting audio.

13. A computerized system for in-vehicle indication management, the computerized system comprises a processor that comprises an integrated circuit and is configured to:
obtain, during a driving session of a vehicle, audio information about audio generated outside the vehicle;
estimate whether the driving affecting audio is heard within the vehicle; and
generate a driving relevant in-vehicle audio indicative of the driving affecting audio, only when the vehicle is being driven in a human driving mode, and when estimating that the driving affecting audio is not being heard within the vehicle.

14. The computerized system according to claim 13, wherein the processor is further configured to:
generate a signature of the audio information by:
perform a first number of signature generating iterations using a convolutional neural network of fixed connectivity; and
perform additional signature generation iterations that involve deactivating, per each additional signature generation iteration, spanning elements that are irrelevant to the additional signature generation iteration; and
search, by applying a machine learning process trained to locate the driving affecting audio, for a matching signature of the driving affecting audio.

* * * * *